(12) United States Patent
Otsuka

(10) Patent No.: US 8,478,503 B2
(45) Date of Patent: Jul. 2, 2013

(54) VEHICLE CONTROLLING APPARATUS

(75) Inventor: Takayuki Otsuka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 111 days.

(21) Appl. No.: 12/994,625

(22) PCT Filed: Jan. 13, 2009

(86) PCT No.: PCT/JP2009/050324
§ 371 (c)(1),
(2), (4) Date: Nov. 24, 2010

(87) PCT Pub. No.: WO2010/082303
PCT Pub. Date: Jul. 22, 2010

(65) Prior Publication Data
US 2011/0077835 A1    Mar. 31, 2011

(51) Int. Cl.
*G06F 19/00* (2011.01)
(52) U.S. Cl.
USPC .................. 701/99; 701/37; 701/38; 340/5.5; 340/5.512
(58) Field of Classification Search
USPC ............ 701/37, 38, 99; 280/5.5, 5.507, 5.512
See application file for complete search history.

(56) References Cited

U.S. PATENT DOCUMENTS

2008/0249689 A1* 10/2008 Matsumoto et al. ............ 701/48
2011/0266760 A1* 11/2011 Itabashi ..................... 280/5.507

FOREIGN PATENT DOCUMENTS

| JP | A-11-132069 | 5/1999 |
| JP | A-2004-168148 | 6/2004 |
| JP | A-2007-315203 | 12/2007 |
| JP | A-2008-105472 | 5/2008 |
| JP | A-2008-213556 | 9/2008 |
| JP | A-2008-223584 | 9/2008 |
| WO | WO 2008/050782 A1 | 5/2008 |

OTHER PUBLICATIONS

International Search Report dated Feb. 17, 2009 in corresponding International Application No. PCT/JP2009/050324 (with translation).

* cited by examiner

Primary Examiner — Gertrude Arthur Jeanglaude
(74) Attorney, Agent, or Firm — Oliff & Berridge, PLC

(57) ABSTRACT

A vehicle controlling apparatus that performs vehicle body vibration-damping control to suppress vibration occurring in a vehicle body by changing wheel torque of driving wheels by controlling output torque of an engine, wherein an electronic control unit is provided with a vehicle body vibration-damping control inhibiting unit that inhibits the vehicle body vibration-damping control such that a drive system of a vehicle, which transmits power of the engine, does not resonate with execution of the vehicle body vibration-damping control, or/and a vehicle body vibration-damping control adjusting unit that adjusts a control amount of the vehicle body vibration-damping control in a direction to suppress a vibration-damping suppression effect of the vehicle body vibration-damping control.

12 Claims, 9 Drawing Sheets

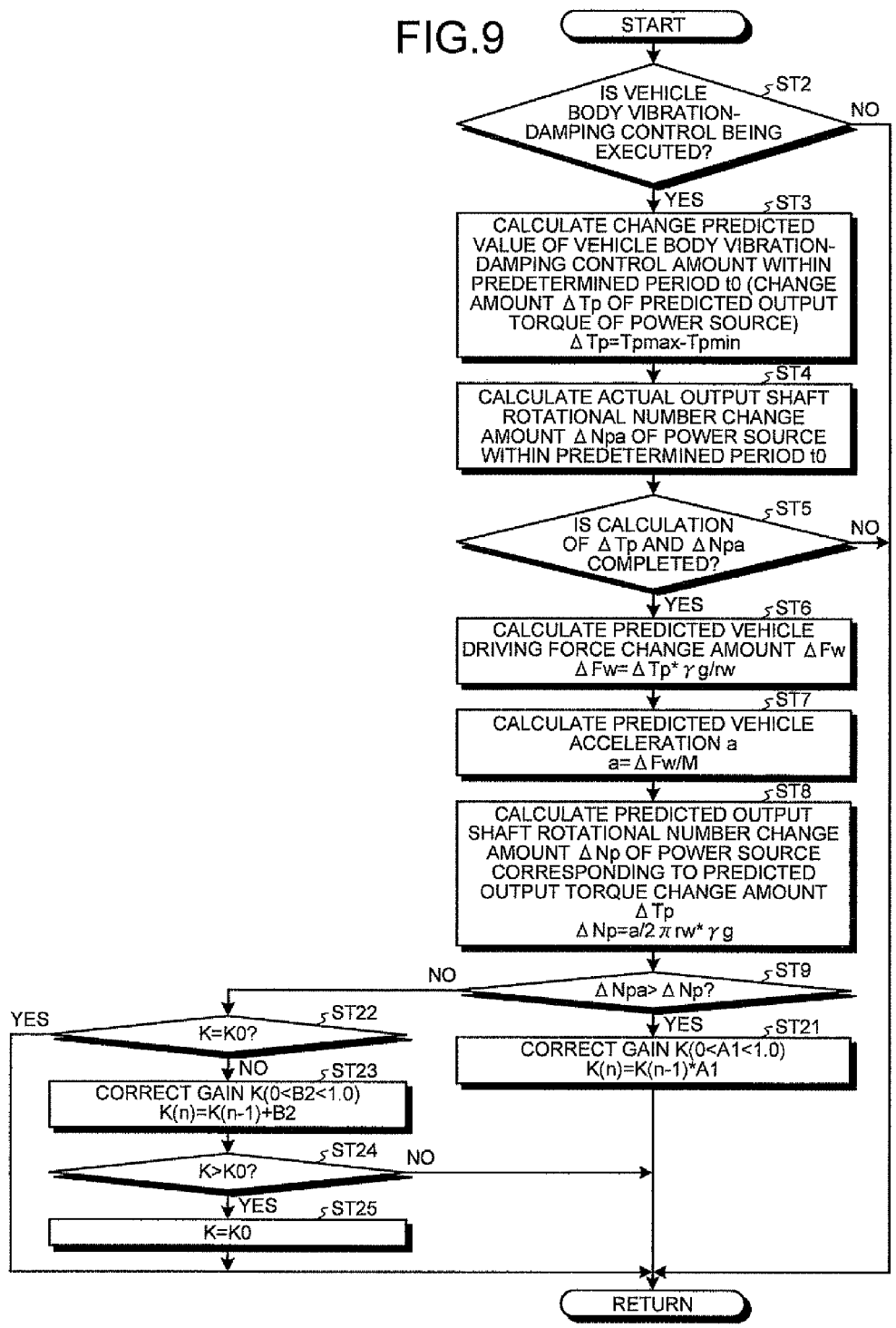

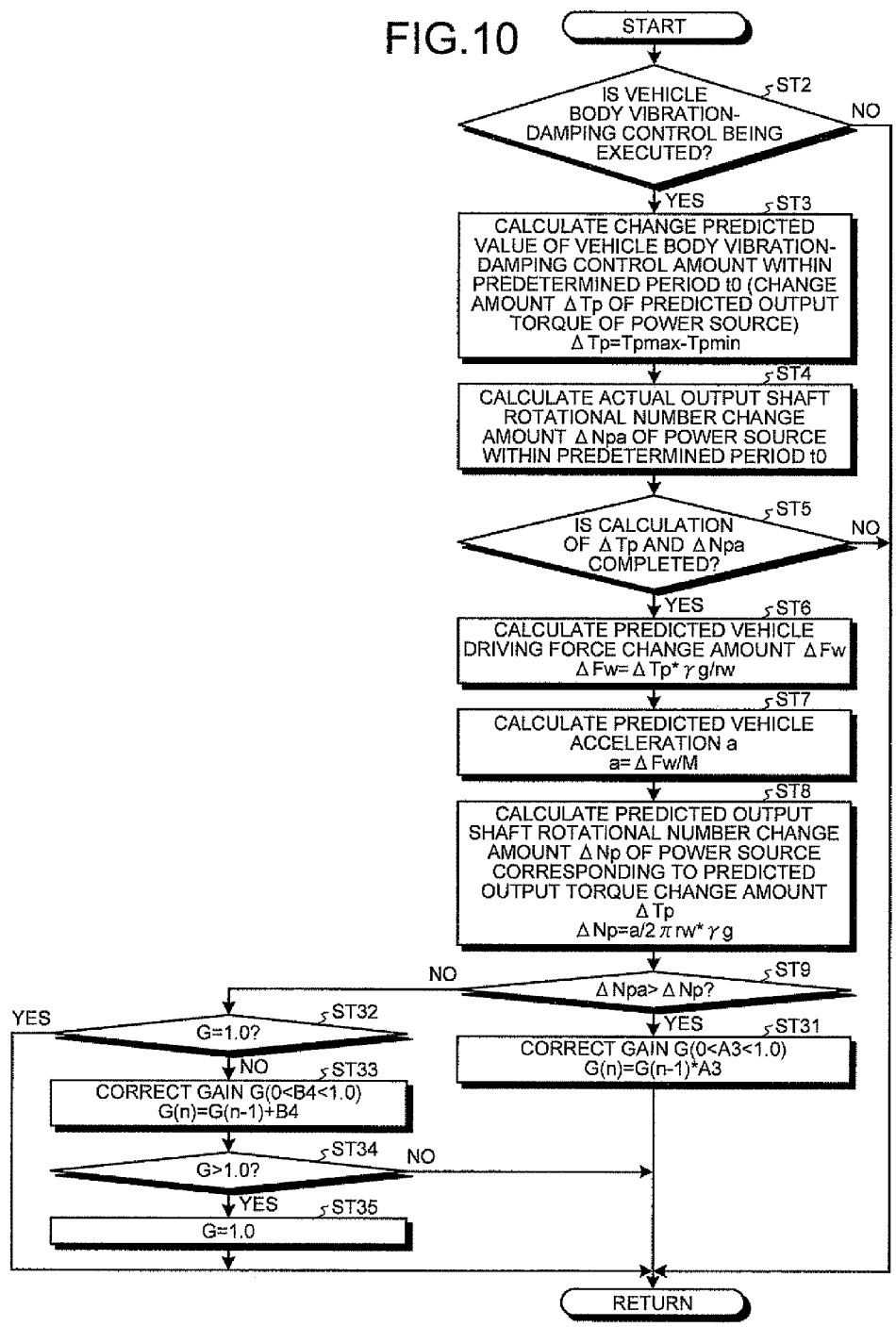

VEHICLE CONTROLLING APPARATUS

TECHNICAL FIELD

The present invention relates to a vehicle controlling apparatus for performing vehicle body vibration-damping control for suppressing vibration occurring in a vehicle body.

BACKGROUND ART

Technology referred to as the vehicle body vibration-damping control to suppress the vibration occurring in the vehicle body by using predetermined vehicle body vibration-damping suppressing means is conventionally known. For example, in the vehicle body vibration-damping control, pitching motion to increase or decrease driving torque of a driving wheel (hereinafter, referred to as "wheel torque") to suppress the vibration by the wheel torque is generated in the vehicle body. Herein, the following Patent Document 1 discloses technology to correct an input command so as to suppress the vibration of the vehicle body by using a motion model, which is a mechanical model of vibration of a tire of the vehicle, vibration below a spring of the vehicle body in a suspension and vibration above the spring of the vehicle body received by the vehicle body itself. Also, the following Patent Document 2 discloses technology to suppress vehicle pitch bounce vibration by controlling output torque of an engine.

Meanwhile, the following Patent Documents 3 and 4 disclose technology to suppress vibration occurring in a drive system (transmission, differential device, drive shaft and the like) of the vehicle by controlling the output torque of an internal-combustion engine.

Patent Document 1: Japanese patent application laid-open No. 2004-168148
Patent Document 2: Japanese patent application laid-open No. 2008-223584
Patent Document 3: Japanese patent application laid-open No. H11-132069
Patent Document 4: Japanese patent application laid-open No. 2007-315203

DISCLOSURE OF INVENTION

Problem To Be Solved By The Invention

In the drive system such as the transmission, the differential device and the like, the vibration (hereinafter, referred to as "drive system vibration") occurs with change and the like of the output torque of a power source (such as engine). In general, in the drive system, a frequency band of the drive system vibration is 2 to 9 Hz while the vibration above the spring of the vehicle body in a pitching direction is approximately 1.5 Hz, so that this does not resonate basically even when the vehicle body vibration-damping control is executed. However, when a high-frequency input enters the wheel from a road surface such as when the vehicle travels on a stone pavement, the high-frequency input is also transmitted to the drive system through the drive wheel and the drive system resonates by a high-frequency component of the road surface input and the drive system vibration, so that deviation occurs in a detected value of a wheel speed of the driving wheel. That is to say, under a travel condition in which the high-frequency input is transmitted from the road surface, the high-frequency component of the road surface input is superimposed on the detected value of the wheel speed of the driving wheel. Although the high-frequency component is removed by a filter and the like in general, this cannot be completely removed. Also, when executing the vehicle body vibration-damping control when the output torque of the power source is approximately 0, there is a case in which requested output torque of the power source ranges from a plus torque area to a minus torque area across 0 with an execution request of the vehicle vibration-damping control (for example, torque in an opposite direction acts on an output shaft of the power source on which the torque acts in a normal direction by fuel injection stop and the like), thereby allowing the drive system to resonate. Therefore, the deviation occurs in the detected value of the wheel speed of the driving wheel in this case also. Herein, there is a case in which information of the wheel speed of the driving wheel is used when determining the control amount of the vehicle body vibration-damping control, and in this case, when executing the vehicle body vibration-damping control when the drive system resonates, the control amount is set to be unnecessarily high, so that the requested output torque of the power source also is set to be too large, and actual output torque becomes larger than the requested output torque of the power source originally required when executing the vehicle body vibration-damping control. Since amplification of the actual output torque in such power source directly leads to unnecessary amplification of the wheel torque in the driving wheel, a driver feels roughness by excessive suppression of the pitching motion of the vehicle body and the vibration back and forth of the vehicle occurs, so that driving quality is deteriorated.

Therefore, an object of the present invention is to improve such disadvantages of the conventional example and to provide the vehicle controlling apparatus capable of preventing the deterioration of the driving quality associated with the execution of the vehicle body vibration-damping control when the drive system vibration occurs.

Means for Solving Problem

In order to achieve the object, according to one aspect of the present invention, in a vehicle controlling apparatus that performs vehicle body vibration-damping control to suppress vibration occurring in a vehicle body by changing wheel torque of a driving wheel by controlling output torque of a power source, the vehicle controlling apparatus inhibits the vehicle body vibration-damping control such that a drive system of a vehicle, which transmits power of the power source, does not resonate with execution of the vehicle body vibration-damping control, or adjusts a control amount of the vehicle body vibration-damping control in a direction to suppress a vibration suppression effect of the vehicle body vibration-damping control.

Here, the vehicle controlling apparatus may compare a change amount of predicted output torque of the power source when executing the vehicle body vibration-damping control with a change amount of actual output torque of the power source within a change period of the predicted output torque to judge that the drive system resonates with the execution of the vehicle body vibration-damping control when the change amount of the actual output torque is larger than the change amount of the predicted output torque, and may perform inhibiting operation of the vehicle body vibration-damping control or adjusting operation of the control amount of the vehicle body vibration-damping control when it is judged that the drive system resonates.

Further, the vehicle controlling apparatus may compare a change amount of predicted output shaft rotational number of the power source according to a change amount of a predicted output torque of the power source when executing the vehicle body vibration-damping control with a change amount of an actual output shaft rotational number of the power source within a change period of the predicted output torque to judge that the drive system resonates when the change amount of the actual output shaft rotational number is larger than the change amount of the predicted output shaft rotational number, and may perform inhibiting operation of the vehicle body vibration-damping control or adjusting operation of the control amount of the vehicle body vibration-damping control when it is judged that the drive system resonates.

Further, the vehicle controlling apparatus may release inhibiting operation of the vehicle body vibration-damping control or adjusting operation of the control amount of the vehicle body vibration-damping control when a control condition of the drive system is changed.

For example, the vehicle controlling apparatus may release inhibiting operation of the vehicle body vibration-damping control or adjusting operation of the control amount of the vehicle body vibration-damping control when a gear position of a transmission is changed.

Further, the vehicle controlling apparatus may release inhibiting operation of the vehicle body vibration-damping control or adjusting operation of the control amount of the vehicle body vibration-damping control when actual output torque of the power source changes by a predetermined amount or larger.

Further, in the vehicle controlling apparatus, the control amount of the vehicle body vibration-damping control may be adjusted by correction of a gain used when setting the control amount.

Further, in order to achieve the object, according to another aspect of the present invention, in a vehicle controlling apparatus that performs vehicle body vibration-damping control to suppress vibration occurring in a vehicle body by changing wheel torque of a driving wheel by controlling output torque of a power source, the vehicle controlling apparatus includes a vehicle body vibration-damping control inhibiting unit that inhibits the vehicle body vibration-damping control such that a drive system of a vehicle, which transmits power of the power source, does not resonate with execution of the vehicle body vibration-damping control; or/and a vehicle body vibration-damping control amount adjusting unit that adjusts a control amount of the vehicle body vibration-damping control in a direction to suppress a vibration suppression effect of the vehicle body vibration-damping control.

Here, the vehicle controlling apparatus may further include a drive system resonance judging unit that compares a change amount of predicted output toque of the power source when executing the vehicle body vibration-damping control with a change amount of actual output torque of the power source within a change period of the predicted output torque to judge that the drive system resonates with the execution of the vehicle body vibration-damping control when the change amount of the actual output torque is larger than the change amount of the predicted output torque, wherein the vehicle controlling apparatus may be configured to perform inhibiting operation of the vehicle body vibration-damping control by the vehicle body vibration-damping control inhibiting unit or/and adjusting operation of the control amount of the vehicle body vibration-damping control by the vehicle body vibration-damping control amount adjusting unit when the drive system resonance judging unit judges that the drive system resonates.

Further, the vehicle controlling apparatus may include a drive system resonance judging unit that compares a change amount of a predicted output shaft rotational number of the power source according to a change amount of predicted output torque of the power source when executing the vehicle body vibration-damping control with a change amount of an actual output shaft rotational number of the power source within a change period of the predicted output torque to judge that the drive system resonates with the execution of the vehicle body vibration-damping control when the change amount of the actual output shaft rotational number is larger than the change amount of the predicted output shaft rotational number, wherein the vehicle controlling apparatus may be configured to perform inhibiting operation of the vehicle body vibration-damping control by the vehicle body vibration-damping control inhibiting unitor/and adjusting operation of the control amount of the vehicle body vibration-damping control by the vehicle body vibration-damping control amount adjusting unit when the drive system resonance judging unit judges that the drive system resonates.

Further, the vehicle controlling apparatus may include a vehicle body vibration-damping control returning unit that releases inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when a control condition of the drive system is changed.

For example, as the vehicle body vibration-damping control returning unit may release inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when a gear position of a transmission is changed.

Further, the vehicle body vibration-damping control returning unit may release inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when actual output torque of the power source changes by a predetermined amount or larger.

Further, the vehicle body vibration-damping control amount adjusting unit may be configured to adjust the control amount by correction of a gain used when setting the control amount of the vehicle body vibration-damping control.

Effect of the Invention

The vehicle controlling apparatus according to the present invention does not execute the vehicle body vibration-damping control using the information of the wheel speed on which the noise (high-frequency component) is superimposed or with deviation such that the drive system does not resonate. Also, the vehicle controlling apparatus adjusts the control amount of the vehicle body vibration-damping control in a direction to suppress a vibration-damping effect of the vehicle body vibration-damping control (that is to say, to decrease the control amount) in place of inhibiting the vehicle body vibration-damping control such that the drive system does not resonate. Therefore, the vehicle controlling apparatus can prevent the deterioration of the driving quality by the occurrence of the feeling of roughness due to the excessive suppression of the pitching motion of the vehicle body and the occurrence of the vibration back and fourth of the vehicle.

BRIEF DESCRIPTION OF DRAWINGS

FIG. 9 is a flowchart for explaining an example of adjusting operation of the vehicle body vibration-damping control amount of a second embodiment in the vehicle controlling apparatus according to the present invention.

FIG. 10 is a flowchart for explaining another example of the adjusting operation of the vehicle body vibration-damping control amount of the second embodiment in the vehicle controlling apparatus according to the present invention.

| EXPLANATIONS OF LETTERS OR NUMERALS | |
|---|---|
| 1 | Electronic control unit (ECU) |
| 2 | Drive controlling unit (drive controlling means) |
| 3 | Vehicle body vibration-damping controlling unit (vehicle body vibration-damping control amount setting means) |
| 3b | Adder |
| 3c | Driving torque converting unit |
| 3d | Vehicle body vibration-damping control command determining unit |
| 3j | FF control gain setting unit |
| 3l | FB control gain setting unit |
| 3f, 3h | Secondary regulator unit |
| 10 | Vehicle |
| 20 | Engine (power source) |
| 30 | Transmission |
| 31 | Shift position sensor |
| 42 | Accelerator pedal operation amount obtaining means |
| $61_{FL}$, $61_{FR}$, $61_{RL}$, $61_{RR}$ | Wheel speed obtaining means |
| 62 | Output shaft rotational number detecting means |
| $W_{FL}$, $W_{FR}$, $W_{RL}$, $W_{RR}$ | Wheel |

BEST MODE(S) FOR CARRYING OUT THE INVENTION

Embodiments of a vehicle controlling apparatus according to the present invention are hereinafter described in detail with reference to the drawings.

Meanwhile, the invention is not limited by the embodiments.

Embodiments

[First Embodiment]

A first embodiment of the vehicle controlling apparatus according to the present invention is described with reference to FIGS. 1 to 8.

Figure 1:
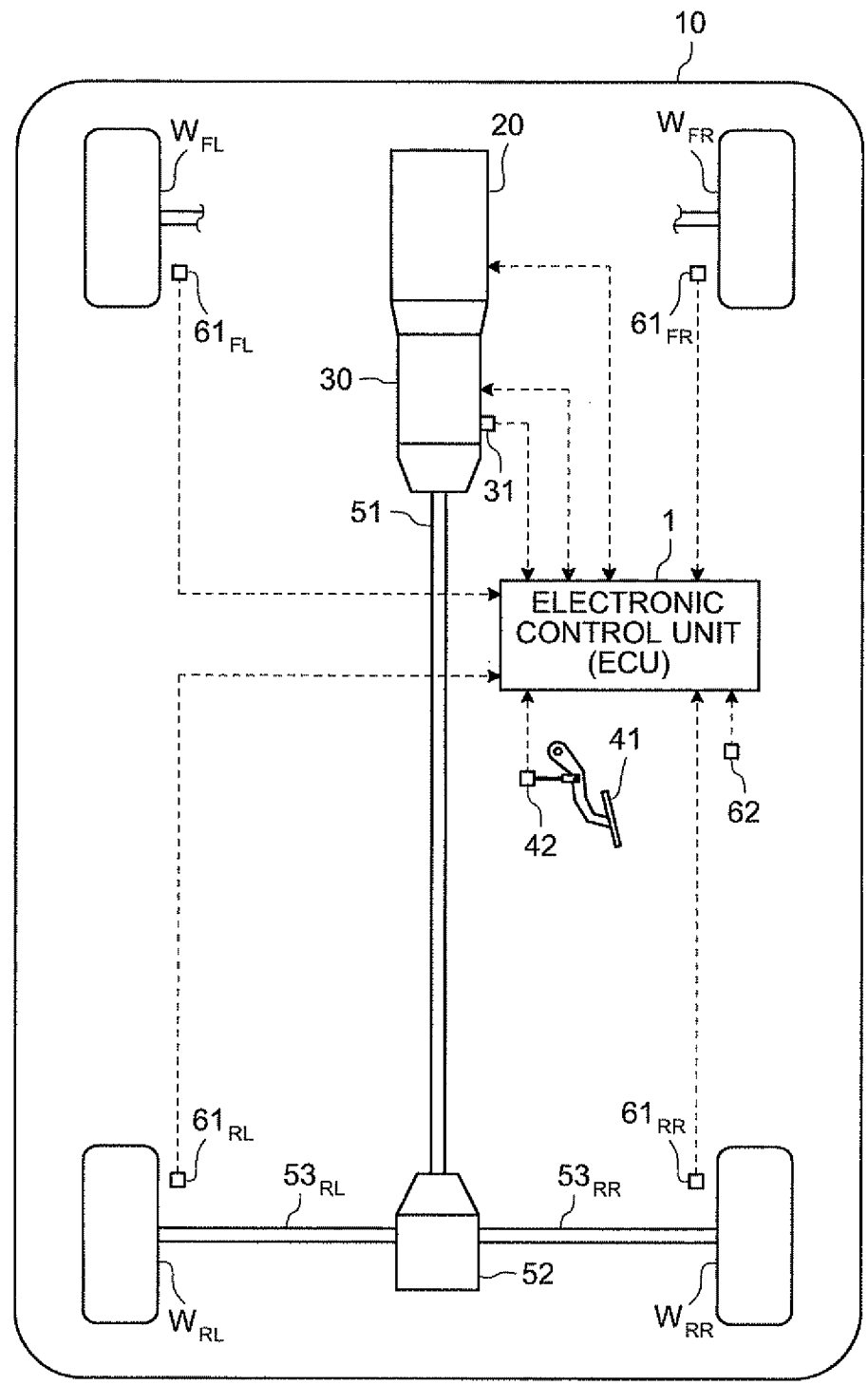
FIG. 1 is a view illustrating an example of a vehicle to which a vehicle controlling apparatus according to the present invention is applied.

The vehicle controlling apparatus of the first embodiment is provided as a function of an electronic control unit (ECU) 1 illustrated in FIG. 1. The electronic control unit 1 is composed of a central processing unit (CPU) not illustrated, a read only memory (ROM) for storing a predetermined control program and the like in advance, a random access memory (RAM) for temporarily storing a calculation result of the CPU and a backup RAM for storing information provided in advance and the like.

First, an example of a vehicle 10 to which the vehicle controlling apparatus is applied is illustrated in FIG. 1. Herein, a front engine rear drive (FR) vehicle, which transmits an output (output torque) from a power source on a front side of the vehicle to driving wheels $W_{RL}$ and $W_{RR}$ on a rear side of the vehicle as wheel driving force through a power transmission device such as a transmission is described as an example. Meanwhile, the vehicle controlling apparatus of the first embodiment is also applicable to a front engine front drive (FF) vehicle and a four-wheel-drive vehicle in addition to the FR vehicle. This is also applicable to a mid-engine vehicle and a rear-engine vehicle.

The power source of the vehicle 10 may include an engine represented by an internal-combustion engine, a motor and the like. Therefore, the vehicle controlling apparatus of the first embodiment is also applicable to a so-called hybrid vehicle equipped with at least the engine and the motor as the power source and to an electric vehicle equipped with the motor as the power source. In the first embodiment, the vehicle equipped with an engine 20 as the power source is described as an example. Herein, as the engine 20, the internal-combustion engine, which is a thermal engine for burning fuel in a combustion chamber and converting heat energy thereby generated to mechanical energy and is a reciprocating piston engine for outputting mechanical power from an output shaft (crankshaft) by reciprocating motion of a piston not illustrated, is described as an example. Specifically, the engine 20 may include a gasoline engine fueled by gasoline, a diesel engine fueled by light oil and the like.

A fuel injection device not illustrated and the like is provided on the engine 20, and operation of the fuel injection device and the like is controlled by drive controlling means of the electronic control unit 1. The drive controlling means is for generating requested wheel torque (requested wheel driving force) corresponding to a drive request and the like of a driver in the driving wheels $W_{RL}$ and $W_{RR}$. The drive controlling means adjusts the output of the engine 20 by controlling a fuel injection amount in a case of the diesel engine, for example, and when a gear position of the transmission 30 is not changed, this generates wheel torque (wheel driving force) corresponding to the output in the driving wheels $W_{RL}$ and $W_{RR}$ in response to the drive request and the like of the driver. That is to say, the engine 20 serves as a vehicle drive device for adjusting magnitude of the wheel torque (wheel driving force) together with the transmission 30 to be described later, and is capable of generating the output (driving torque, driving force) for realizing the requested wheel torque (requested wheel driving force). Meanwhile, the fuel injection amount (in other words, requested wheel torque or requested wheel driving force, or requested vehicle driving torque or requested vehicle driving force) is determined according to an operation amount of an accelerator pedal 41 of the driver and a requested value of an automatic drive mode and the like if being set. The operation amount of the accelerator pedal 41 is pedal force input to the accelerator pedal 41 and a depression amount (that is to say, motion amount) of the accelerator pedal 41, which is detected or estimated by accelerator pedal operation amount obtaining means 42.

The output (driving torque, driving force) of the engine 20 is input to the transmission 30 and is output to a propeller shaft 51 after gear shifting according to the gear position or a gear ratio at that time. The transmission 30 is a manual transmission, a stepped automatic transmission, a continuous automatic transmission or the like. Herein, the stepped automatic transmission is described as an example of the transmission 30. Hydraulic adjusting means not illustrated is provided on the transmission 30, and the hydraulic adjusting means of which operation is controlled by the above-described drive controlling means of the electronic control unit 1 switches the gear position (gear ratio). The drive controlling means controls the hydraulic adjusting means to realize a target gear position set based on the requested wheel torque (requested wheel driving force), a vehicle speed and the like, for example, thereby generating the requested wheel torque (requested wheel driving force) corresponding to the drive request and the like of the driver in the driving wheels $W_{RL}$ and $W_{RR}$.

Rotational torque of the propeller shaft 51 is input to a differential device 52 to be distributed to right and left drive shafts $53_{RR}$ and $53_{RL}$ and is transmitted to the driving wheels $W_{RR}$ and $W_{RL}$ coupled to the drive shafts $53_{RR}$ and $53_{RL}$ as the wheel torque (wheel driving force).

The vehicle 10 moves forward or backward by generating the wheel torque (wheel driving force) in the driving wheels $W_{RL}$ and $W_{RR}$. The vehicle 10 is provided with a brake device not illustrated for stopping or decelerating the traveling vehicle 10. The brake device is configured to be able to generate requested wheel braking torque (requested wheel braking force) of respective magnitudes in each of wheels $W_{FL}$, $W_{FR}$, $W_{RL}$ and $W_{RR}$. For example, the brake device is provided with an actuator controlled by the brake controlling means of the electronic control unit 1 to adjust the requested wheel braking torque (requested wheel braking force).

Also, the vehicle 10 is provided with wheel speed obtaining means $61_{FL}$, $61_{FR}$, $61_{RL}$ and $61_{RR}$ for obtaining wheel speeds of the wheels $W_{FL}$, $W_{FR}$, $W_{RL}$ and $W_{RR}$. A wheel speed sensor for detecting the wheel speed may be used as each of the wheel speed obtaining means $61_{FL}$, $61_{FR}$, $61_{RL}$ and $61_{RR}$, for example.

Figure 2:
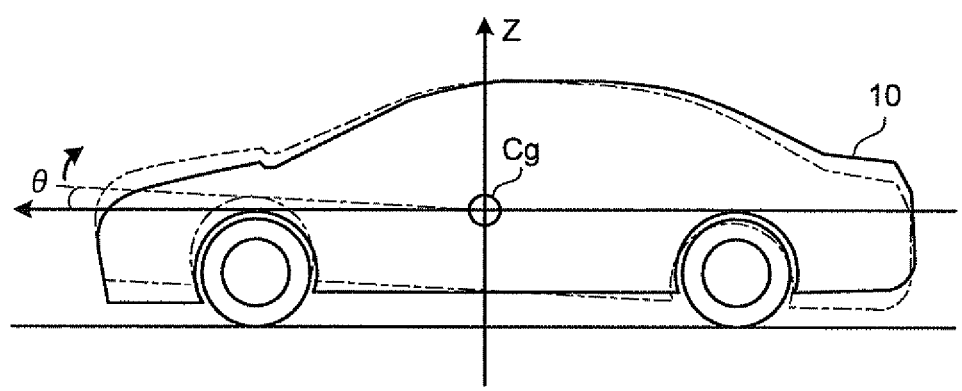
FIG. 2 is a view for explaining a state variable of sprung vibration in the vehicle controlling apparatus according to the present invention.

In the vehicle 10, when external force and torque (that is to say, disturbance) acts on the traveling wheels $W_{FL}$, $W_{FR}$, $W_{RL}$ and $W_{RR}$ by unevenness of a road surface and the like, for example, the external force and the like is transmitted to a vehicle body through the wheels $W_{FL}$, $W_{FR}$, $W_{RL}$ and $W_{RR}$ and a suspension (not illustrated). Therefore, in the vehicle 10, vibration of 1 to 4 Hz, more accurately, the vibration of approximately 1.5 Hz through the wheels $W_{FL}$, $W_{FR}$, $W_{RL}$ and $W_{RR}$ and the suspension (hereinafter, referred to as "sprung vibration") might occur in the vehicle body by an input from the road surface while traveling. The sprung vibration includes a component in a vertical direction (Z direction) (hereinafter, referred to as "bounce vibration") of the vehicle 10 (strictly, a center of gravity of the vehicle Cg) and a component in a pitch direction (θ direction) (hereinafter, referred to as "pitch vibration") centered on the center of gravity of the vehicle Cg illustrated in FIG. 2. When the sprung vibration occurs, at least any one of the bounce vibration and the pitch vibration occurs. Meanwhile, an attitude of the vehicle 10 at the time of nose lift is illustrated in FIG. 2. In a case in which the vehicle drive device (engine 20 and transmission 30) acts based on the drive request and the like of the driver and the wheel torque (wheel driving force) of the driving wheels $W_{RL}$ and $W_{RR}$ changes also, the similar sprung vibration (at least any one of bounce vibration and pitch vibration) might occur in the vehicle 10.

The vehicle 10 of the first embodiment is provided with the vehicle controlling apparatus that performs vehicle body vibration-damping control for suppressing such sprung vibration as a function of the electronic control unit 1 as described above. The vehicle controlling apparatus is for controlling the wheel torque (wheel driving force) of the driving wheels $W_{RL}$ and $W_{RR}$ by using the above-described vehicle drive device (engine 20), thereby suppressing the sprung vibration occurring in the vehicle body. At the time of execution of the vehicle body vibration-damping control, a control amount (requested output torque of power source, requested wheel torque of driving wheels $W_{RL}$ and $W_{RR}$ and the like) for the vehicle body vibration-damping control is added to or subtracted from the control amount such as normal travel requested output torque of the power source, normal travel requested wheel torque of the driving wheels $W_{RL}$ and $W_{RR}$ and the like originally required for travel of the vehicle 10.

In the first embodiment, a motion model of the sprung vibration (bounce vibration and pitch vibration) of the vehicle body is built and a state variable of the sprung vibration is calculated by the motion model. The state variable of the sprung vibration is displacements z and θ of the vehicle body when driver requested torque corresponding to the drive request of the driver (specifically, value obtained by converting the same to requested wheel torque of driving wheels $W_{RL}$ and $W_{RR}$) and current wheel torque (specifically, estimated value thereof) are input to the motion model and change ratios thereof dz/dt and dθ/dt. Then, in the first embodiment, the driver requested torque is corrected such that the state variables converge to 0 to adjust the output (driving torque, driving force) of the vehicle drive device, thereby suppressing such sprung vibration.

Figure 3:
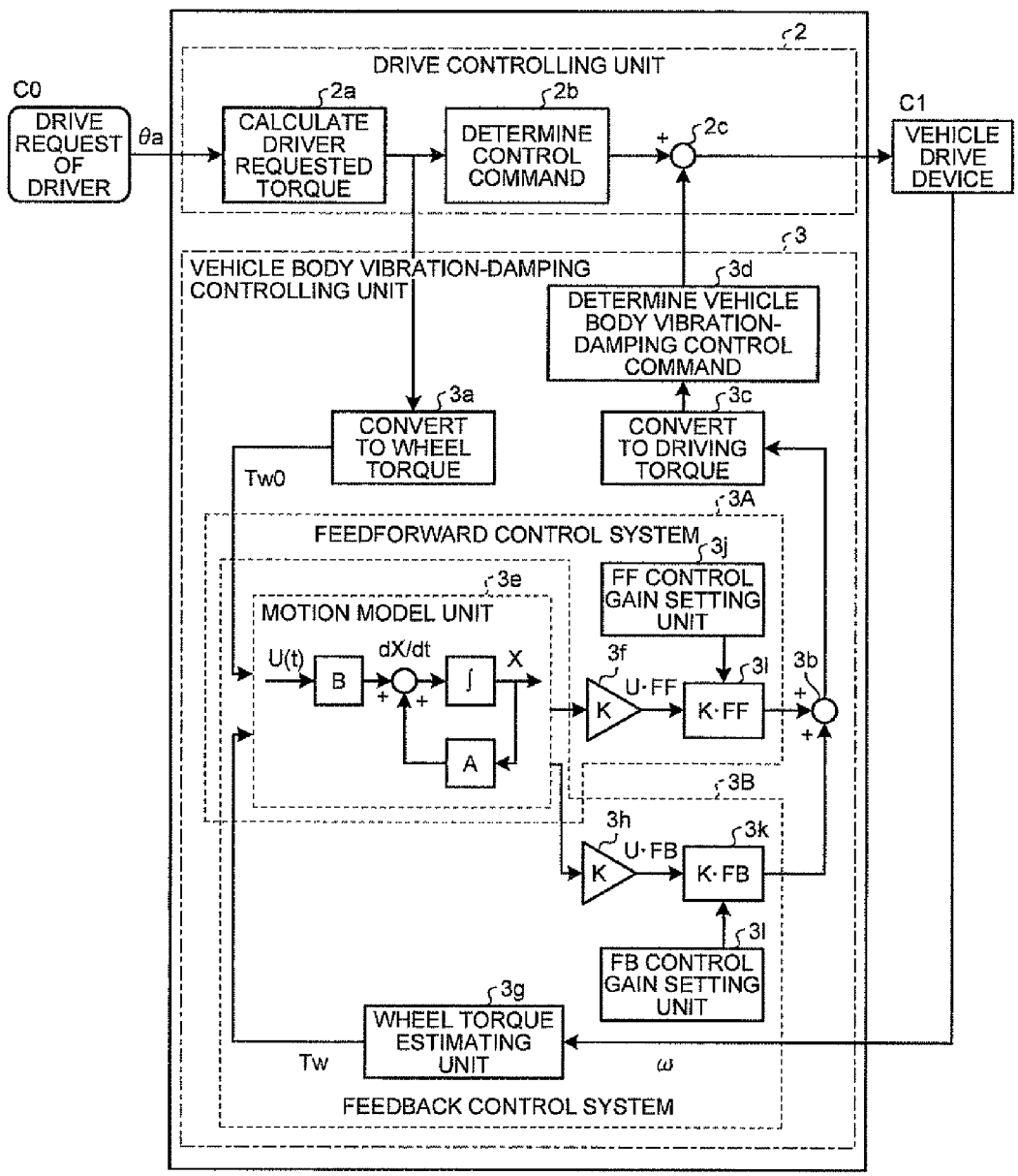
FIG. 3 is a schematic diagram illustrating an example of a functional configuration related to the vehicle body vibration-damping control of the vehicle controlling apparatus according to the present invention in a form of a control block.

A control block diagram schematically illustrating a configuration of the vehicle controlling apparatus is illustrated in FIG. 3. The vehicle controlling apparatus is provided with a drive controlling unit 2 as the drive controlling means for providing the drive request of the driver to the vehicle 10 and a vehicle body vibration-damping controlling unit 3 as vehicle body vibration-damping control amount setting means for setting vehicle body vibration-damping control compensation torque (vehicle body vibration-damping control compensation amount as control amount of vehicle body vibration-damping control) for suppressing the sprung vibration (bounce vibration and pitch vibration) of the vehicle body. In the vehicle controlling apparatus, the drive controlling unit 2 provides the driver requested torque (specifically, control command corresponding to driver requested torque) corrected based on the vehicle body vibration-damping control compensation torque (specifically, vehicle body vibration-damping control command corresponding to vehicle body vibration-damping control compensation torque) to the vehicle drive device (engine 20), thereby suppressing amplification of the sprung vibration.

First, the drive controlling unit 2 is broadly divided into a driver requested torque calculating unit 2a for obtaining the driver requested torque (in other words, driver requested driving torque) of the vehicle drive device corresponding to the drive request of the driver and a control command determining unit 2b for determining a control command to the vehicle drive device based on the driver requested torque. The drive controlling unit 2 is also provided with an adder 2c.

In the drive controlling unit 2, a drive request of the driver (C0), that is to say, the operation amount of the accelerator pedal 41 (for example, depression amount θa) is converted to the driver requested torque in the vehicle drive device by the driver requested torque calculating unit 2a, and this is converted to the control command to the vehicle drive device by the control command determining unit 2b to be transmitted to the vehicle drive device (C1). Specifically, when the vehicle drive device to be controlled in the vehicle body vibration-damping control is the engine 20, in the drive controlling means, the drive request of the driver is converted to the requested output torque of the engine 20 by the driver requested torque calculating unit 2a and this is converted to the control command to the engine 20 by the control command determining unit 2b to be transmitted to the engine 20. The control command to the engine 20 is requested throttle opening and requested ignition timing when the engine 20 is the gasoline engine and a requested fuel injection amount when this is the diesel engine, for example. When the power source is the motor, the control command is a requested current amount.

On the other hand, the vehicle body vibration-damping controlling unit 3 sets the vehicle body vibration-damping control compensation amount by feedback control based on at least the wheel speeds of the wheels $W_{FL}$, $W_{FR}$, $W_{RL}$ and $W_{RR}$. The vehicle body vibration-damping controlling unit 3 is allowed to set the vehicle body vibration-damping control compensation amount by feedforward control based on the driver requested torque for the vehicle 10 together with the feedback control based on the wheel speed of the wheel of the vehicle 10. Therefore, the vehicle body vibration-damping controlling unit 3 is provided with a feedforward control system 3A and a feedback control system 3B. Also, the vehicle body vibration-damping controlling unit 3 is provided with a wheel torque converting unit 3a for converting the driver requested torque of the driver requested torque calculating unit 2a to driver requested wheel torque Tw0 in the driving wheels $W_{RL}$ and $W_{RR}$, an adder 3b, a driving torque converting unit 3c for converting a correction amount of the driver requested wheel torque Tw0 to a unit of the driving torque of the vehicle drive device and a vehicle body vibration-damping control command determining unit 3d for determining the vehicle body vibration-damping control command to the vehicle drive device based on the driving torque.

The feedforward control system 3A has a configuration of a so-called optimal regulator and is provided with a motion model unit 3e of the sprung vibration of the vehicle body and a FF secondary regulator unit 3f. In the feedforward control system 3A, the driver requested wheel torque Tw0 converted by the wheel torque converting unit 3a is input to the motion model unit 3e. In the motion model unit 3e, a response of the state variable of the vehicle 10 for the input torque is calculated. The FF secondary regulator unit 3f calculates a FF system vibration-damping torque compensation amount U·FF as the correction amount of the driver requested wheel torque Tw0, which converges the state variable to a minimum value based on a predetermined gain K to be described later. The FE system vibration-damping torque compensation amount U·FF is a feedforward control amount (FF control amount) of the driving torque (driving force) in the feedforward control system 3A based on the driver requested torque (requested driving force) for the vehicle 10, that is to say, a vehicle body vibration-damping control compensation amount in the feedforward control.

The feedback control system 3B also has the configuration of the so-called optimal regulator. The feedback control system 3B is provided with a wheel torque estimating unit 3g for estimating a wheel torque estimated value Tw of the driving wheels $W_{RL}$ and $W_{RR}$, the motion model unit 3e also used by the feedforward control system 3A and a FB secondary regulator unit 3h. In the feedback control system 3B, the wheel torque estimating unit 3g calculates the wheel torque estimated value Tw of the driving wheels $W_{RL}$ and $W_{RR}$ based on a wheel speed ω as described later and the wheel torque estimated value Tw is input to the motion model unit 3e as a disturbance input. In the motion model unit 3e, the response of the state variable of the vehicle 10 for the input torque is calculated. The FB secondary regulator unit 3h calculates a FB system vibration-damping torque compensation amount U·FB as the correction amount of the driver requested wheel torque Tw0, which converges the state variable to the minimum value, based on the predetermined gain K to be described later. The FB system vibration-damping torque compensation amount U·FB is a feedback control amount (FB control amount) of the driving torque (driving force) in the feedback control system 3B corresponding to a variation amount of the wheel speed ω based on the external force or the torque (disturbance) by the input from the road surface to the wheels $W_{FL}$, $W_{FR}$, $W_{RL}$ and $W_{RR}$, that is to say, the vehicle body vibration-damping control compensation amount in the feedback control. Meanwhile, although the motion model unit 3e is used by the feedforward control system 3A and the feedback control system 3B in the first embodiment, the motion model unit may be separately provided.

In the vehicle body vibration-damping controlling unit 3, the FF system vibration-damping torque compensation amount U·FF being the FF control amount (that is to say, vehicle body vibration-damping control compensation amount in feedforward control) of the feedforward control system 3A and the FB system vibration-damping torque compensation amount U·FB being the FB control amount (that is to say, vehicle body vibration-damping control compensation amount in feedback control) of the feedback control system 3B as described above are transmitted to the adder 3b. The adder 3b adds the FF system vibration-damping torque compensation amount U·FF and the FB system vibration-damping torque compensation amount U·FB to calculate the vehicle body vibration-damping control compensation wheel torque. In the vehicle body vibration-damping controlling unit 3, the vehicle body vibration-damping control compensation wheel torque is converted to a unit of the requested torque (driving torque) of the vehicle drive device by the driving torque converting unit 3c, and the converted value is input to the vehicle body vibration-damping control command determining unit 3d as final vehicle body vibration-damping control compensation torque (total vehicle body vibration-damping control compensation amount). The vehicle body vibration-damping control compensation torque is converted to the vehicle body vibration-damping control command to the vehicle drive device by the vehicle body vibration-damping control command determining unit 3d and is transmitted to the adder 2c to which the control command from the control command determining unit 2b is input in the drive controlling unit 2. The vehicle body vibration-damping control command is vehicle body vibration-damping control compensation throttle opening and vehicle body vibration-damping control compensation ignition timing when the engine 20 is the gasoline engine and a vehicle body vibration-damping control compensation fuel ignition amount when this is the diesel engine, for example. Also, when the power source is the motor, the control command is a vehicle body vibration-damping control compensation current amount.

The adder $2c$ corrects the control command corresponding to the driver requested torque such that the sprung vibration does not occur based on the vehicle body vibration-damping control command corresponding to the vehicle body vibration-damping control compensation torque, and transmits the control command corresponding to corrected requested torque to the vehicle drive device.

The vehicle controlling apparatus of the first embodiment is provided with the vehicle body vibration-damping controlling unit 3 for setting the vehicle body vibration-damping control compensation amount in this manner. In the first embodiment, the vehicle body vibration-damping controlling unit 3 is allowed to change the vehicle body vibration-damping control compensation amount based on a state of the vehicle 10, thereby realizing appropriate vehicle body vibration-damping control according to the state of the vehicle 10. As a parameter indicating the state of the vehicle 10, there are the vehicle speed of the vehicle 10, the gear position of the transmission 30, an engine rotational speed as an output rotational speed of the engine 20 (rotational speed of output shaft of motor when power source is motor), the driver requested torque and the like.

For example, the vehicle body vibration-damping controlling unit 3 changes the vehicle body vibration-damping control compensation amount set by the feedback control based on at least the wheel speed ω, that is to say, the FB system vibration-damping torque compensation amount U·FB based on the state of the vehicle 10, thereby changing the vehicle body vibration-damping control compensation torque (total vehicle body vibration-damping control compensation amount) based on the state of the vehicle 10. Also, the vehicle body vibration-damping controlling unit 3 may change the vehicle body vibration-damping control compensation amount set by the feedforward control based on the driver requested torque (requested driving force) for the vehicle 10, that is to say, the FF system vibration-damping torque compensation amount U·FF based on the state of the vehicle 10, thereby changing the vehicle body vibration-damping control compensation torque (total vehicle body vibration-damping control compensation amount) based on the state of the vehicle 10. However, the vehicle body vibration-damping controlling unit 3 may also directly change the vehicle body vibration-damping control compensation torque (total vehicle body vibration-damping control compensation amount) obtained by adding the FF system vibration-damping torque compensation amount U·FF and the FB system vibration-damping torque compensation amount U·FB based on the state of the vehicle 10.

The vehicle body vibration-damping controlling unit 3 of the first embodiment sets the vehicle body vibration-damping control compensation torque by separately calculating the FF system vibration-damping torque compensation amount U·FF and the FB system vibration-damping torque compensation amount U·FB and adding them as described above. Therefore, the vehicle body vibration-damping controlling unit 3 can perform upper and lower limit guard and correction for the FF system vibration-damping torque compensation amount U·FF and the FB system vibration-damping torque compensation amount U·FB separately to change them before setting the vehicle body vibration-damping control compensation torque. Therefore, the vehicle body vibration-damping controlling unit 3 can change the vehicle body vibration-damping control compensation torque (total vehicle body vibration-damping control compensation amount) to that based on the state of the vehicle 10 with more accuracy. According to this, it also becomes easy to block any one of the feedforward control and the feedback control according to a driving state of the vehicle 10.

For example, the vehicle body vibration-damping controlling unit 3 of the first embodiment is further provided with a FF control changing unit $3i$ and a FF control gain setting unit $3j$ in the feedforward control system 3A and further provided with a FB control changing unit $3k$ and a FB control gain setting unit 31 in the feedback control system 3B in addition to the above-described configuration. The FF control changing unit $3i$ and the FF control gain setting unit $3j$ are for changing (correcting) the FF system vibration-damping torque compensation amount U·FF according to the state of the vehicle 10. On the other hand, the FB control changing unit $3k$ and the FB control gain setting unit 31 are for changing (correcting) the FB system vibration-damping torque compensation amount U·FB according to the state of the vehicle 10.

The FF control changing unit $3i$ is arranged on a subsequent stage of the FF secondary regulator unit $3f$ and on a precedent stage of the adder $3b$. When the FF system vibration-damping torque compensation amount U·FF is input from the FF secondary regulator unit $3f$, the FF control changing unit $3i$ multiplies a FF control gain K·FF set by the FF control gain setting unit $3j$ according to the state of the vehicle 10 by the FF system vibration-damping torque compensation amount U·FF to change (correct) the FF system vibration-damping torque compensation amount U·FF to that corresponding to the state of the vehicle 10. Then, the FF control changing unit $3i$ outputs the FF system vibration-damping torque compensation amount U·FF changed (corrected) according to the state of the vehicle 10 to the adder $3b$.

Herein, the FF control changing unit $3i$ may perform the upper and lower limit guard such that the FF system vibration-damping torque compensation amount U·FF input from the FF secondary regulator unit $3f$ is in a range of upper and lower limit guard values set in advance, thereby changing the FF system vibration-damping torque compensation amount U·FF. The upper and lower limit guard values are set in advance in a range from −tens of Nm to 0 Nm in a value converted to the unit of the requested torque of the vehicle drive device, for example, and may be a value corresponding to an allowable output torque variable value as an allowable driving force variable value of the engine 20 (allowable output torque variable value of motor when power source is motor). According to this, the FF control changing unit $3i$ can set an appropriate FF system vibration-damping torque compensation amount U·FF, which takes into account control other than the vehicle body vibration-damping control (that is to say, sprung vibration-damping control) by the vehicle controlling apparatus, for example, so that it becomes possible to suppress interference between the sprung vibration-damping control and another control by the vehicle controlling apparatus.

Also, the FF control changing unit $3i$ may perform the upper and lower limit guard for the FF system vibration-damping torque compensation amount U·FF before being output to the adder $3b$ to change the FF system vibration-damping torque compensation amount U·FF. The upper and lower limit guard values at that time are values set in advance in a range to be smaller than +0.00 G when being converted to acceleration and deceleration and may be the values according to allowable acceleration and deceleration of the vehicle 10, for example. According to this, the FF control changing unit $3i$ can prevent change in motion of the vehicle 10 from becoming large beyond expectation of the driver by the vehicle body vibration-damping control by the vehicle controlling apparatus, for example, and set the appropriate FF system vibration-damping torque compensation amount U·FF, which does not provide the driver a feeling of discomfort.

Next, the FB control changing unit 3k is arranged on a subsequent stage of the FB secondary regulator unit 3h and on a precedent stage of the adder 3b. When the FB system vibration-damping torque compensation amount U·FB is input from the FB secondary regulator unit 3h, the FB control changing unit 3k multiplies the FB control gain K·FB set by the FE control gain setting unit 31 according to the state of the vehicle 10 by the FB system vibration-damping torque compensation amount U·FB, and changes (corrects) the FB system vibration-damping torque compensation amount U·FB to that corresponding to the state of the vehicle 10. Then, the FE control changing unit 3k outputs the FB system vibration-damping torque compensation amount U·FB changed (corrected) according to the state of the vehicle 10 to the adder 3b.

Herein, the FE control changing unit 3k may perform the upper and lower limit guard such that the FB system vibration-damping torque compensation amount U·FB input from the FB secondary regulator unit 3h is in the range of the upper and lower limit guard values set in advance, thereby changing the FB system vibration-damping torque compensation amount U·FB. The upper and lower limit guard values are the values set in advance in a range of ±tens of Nm in a value converted to the unit of the requested torque of the vehicle drive device, for example, and may be the values corresponding to the allowable output torque variable value as the allowable driving force variable value of the engine 20 (allowable output torque variable value of motor when power source is motor).

According to this, the FB control changing unit 3k can set the appropriate FE system vibration-damping torque compensation amount U·FB, which takes into account the control other than the vehicle body vibration-damping control by the vehicle controlling apparatus (that is to say, sprung vibration control), for example, so that it becomes possible to suppress the interference between the sprung vibration-damping control and another control by the vehicle controlling apparatus.

Also, the FB control changing unit 3k may perform the upper and lower limit guard for the FB system vibration-damping torque compensation amount U·FB before being output to the adder 3b to change the FB system vibration-damping torque compensation amount U·FB. The upper and lower limit guard values at that time are the values set in advance in a range to be in ±a/100 G when being converted to the acceleration and deceleration, and may be the values corresponding to the allowable acceleration and deceleration of the vehicle 10, or example. According to this, the FB control changing unit 3k can prevent the change in the motion of the vehicle 10 from becoming large beyond the expectation of the driver by the vehicle body vibration-damping control by the vehicle controlling apparatus, for example, and set the appropriate FB system vibration-damping torque compensation amount U·FB, which does not provide the driver the feeling of discomfort.

That is to say, in the vehicle body vibration-damping controlling unit 3 of the first embodiment, the FF control gain setting unit 3j sets the FF control gain K·FF corresponding to the state of the vehicle 10 for the FF system vibration-damping torque compensation amount U·FF, and the FF control changing unit 3i multiplies the FF control gain K·FF by the FF system vibration-damping torque compensation amount U·FF. According to this, the FF control changing unit 3i can change (correct) the FF system vibration-damping torque compensation amount U·FF according to the state of the vehicle 10 to transmit to the adder 3b. Also, in the vehicle body vibration-damping controlling unit 3, the FB control gain setting unit 31 sets the FB control gain K·FB according to the state of the vehicle 10 for the FB system vibration-damping torque compensation amount U·FB, and the FB control changing unit 3k multiplies the FB control gain K·FB by the FB system vibration-damping torque compensation amount U·FB. According to this, the FB control changing unit 3k can change (correct) the FB system vibration-damping torque compensation amount U·FB according to the state of the vehicle 10 to transmit to the adder 3b.

In the vehicle body vibration-damping control performed by the vehicle controlling apparatus, as described above, a mechanical motion model of the sprung vibration (bounce vibration and pitch vibration) of the vehicle body is supposed, and a state equation of the state variables in the bounce direction and the pitch direction to which the driver requested wheel torque Tw0 and the wheel torque estimated value Tw (disturbance) are input is composed. Then, in the vehicle body vibration-damping control, the input (torque value) with which the state variables in the bounce direction and the pitch direction converge to 0 is determined using a theory of the optimal regulator from the state equation, and corrects the control command of the vehicle drive device related to the driver requested torque based on the torque value.

Figure 4:
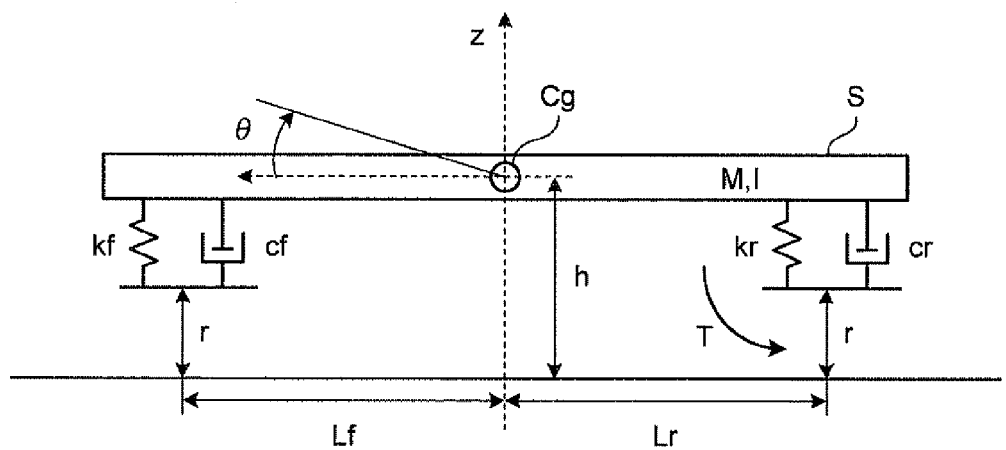
FIG. 4 is a view explaining an example of a mechanical motion model of the sprung vibration supposed in the vehicle controlling apparatus according to the present invention.

As such mechanical motion model, as illustrated in FIG. 4, the model in which the vehicle body is regarded as a rigid body S with mass M and inertia moment I, and the rigid body S is supported by a front wheel suspension with an elastic coefficient kf and a damping coefficient cf and by a rear wheel suspension with an elastic coefficient kr and a damping coefficient cr is described as an example (sprung vibration-damping model of vehicle body). A motion equation in the bounce direction and the motion equation in the pitch direction on the center of gravity of the vehicle Cg in this case may be represented as following equations 1a ant 1b, respectively.

[Equation 1]

$$M\frac{d^2 z}{dt^2} = -kf(z + Lf \cdot \theta) - \qquad (1a)$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

$$I\frac{d^2 \theta}{dt^2} = -Lf\left\{kf(z + Lf \cdot \theta) + cf\left(\frac{dz}{dt} + Lf \cdot \frac{d\theta}{dt}\right)\right\} + \qquad (1b)$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

In the equations 1a and 1b, "Lf and Lr" represent distances from the center of gravity of the vehicle Cg to a front wheel shaft and to a rear wheel shaft, respectively, and "r" represents a wheel radius. Also, "h" represents a distance from the road surface to the center of gravity of the vehicle Cg. Meanwhile, in the equation 1a, first and second terms are components of force from the front wheel shaft and third and fourth terms are components of force from the rear wheel shaft. Also, in the equation 1b, a first term is a moment component of the force from the front wheel shaft and a second term is a moment component of the force from the rear wheel shaft. Also, a third term of the equation 1b is a moment component of force, which wheel torque T(=Tw0+Tw) generated in the driving wheels $W_{RL}$ and $W_{RR}$ provides around the center of gravity of the vehicle Cg.

The equations 1a and 1b can be rewritten in a form of the state equation (of a linear system) as in a following equation 2a by setting the displacements of the vehicle body z and θ and the change ratios thereof dz/dt and dθ/dt as a state variable vector X(t).

$$dX(t)/dt = A \cdot X(t) + B \cdot u(t) \qquad \ldots (2a)$$

In the equation 2a, X(t), A and B are as follows.

$$X(t) = \begin{pmatrix} z \\ dz/dt \\ \theta \\ d\theta/dt \end{pmatrix}, \quad \text{[Equation 2]}$$

$$A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, \quad B = \begin{pmatrix} 0 \\ 0 \\ 0 \\ p1 \end{pmatrix}$$

Components a1 to a4 and b1 to b4 of a matrix A are provided by combining the coefficients z, θ, dz/dt and dθ/dt in the above-described equations 1a ant 1b, and $$a1 = -(kf + kr)/M,$$

$$a2 = -(cf + cr)/M,$$

$$a3 = -(kf \cdot Lf - kr \cdot Lr)/M,$$

$$a4 = -(cf \cdot Lf \cdot cr \cdot Lr)/M,$$

$$b1 = -(Lf \cdot kf - Lr \cdot kr)/I,$$

$$b2 = -(Lf \cdot cf - Lr \cdot cr)/I,$$

$$b3 = -(Lf^2 \cdot kf + Lr^2 \cdot kr)/I,$$

$$b4 = -(Lf^2 \cdot cf + Lr^2 \cdot cr)/I$$

are satisfied.

Also, u(t) in the equation 2a is u(t)=T, and this is the input of the system represented by the equation 2a.

Therefore, by the above-described equation 1b, a component p1 of a matrix B is $$p1 = h/(I \cdot r).$$

When setting u(t) as in a following equation 2b in the equation 2a (state equation), the equation 2a is represented as a following equation 2c.

$$u(t) = -K \cdot X(t) \qquad \ldots (2b)$$

$$dX(t)/dt = (A - BK) \cdot X(t) \qquad \ldots (2c)$$

Therefore, when solving a differential equation (equation 2c) of the state variable vector X(t) by setting an initial value $X_0(t)$ of X(t) to $X_0(t)=(0,0,0,0)$ (assume that there is no vibration before the torque input), if the gain K to converge X(t), that is to say, the displacements in the bounce direction and the pitch direction and magnitude of time rate of change to 0 is determined, the torque value u(t) to suppress the sprung vibration is determined.

The gain K can be determined by using the theory of the so-called optimal regulator. According to the theory, when a value of an evaluation function in a quadratic form (integration range is 0 to ∞)

$$J = \int (X^T Q X + u^T R u) dt \qquad \ldots (3a)$$

is minimum, X(t) stably converges in the state equation (equation 2a), and it is known that a gain matrix K to minimize the evaluation function. J is provided by $$K = R^{-1} \cdot B^T \cdot P.$$

Herein, P is a solution of a Ricatti equation $$-dP/dt = A^T P + PA + Q - PBR^{-1} B^T P.$$

The Ricatti equation can be solved by an optional method known in a field of a linear system, thereby determining the gain K.

Meanwhile, "Q and R" in the evaluation function J and the Ricatti equation are a semi-positive definite symmetric matrix and a positive definite symmetric matrix each of which is optionally set, and a weighting matrix of the evaluation function J determined by a designer of the system. For example, in the case of the motion model herein, Q and R are represented as $$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, \quad R = (1) \quad \text{[Equation 3]}$$

and the like, and in the above-described equation 3a, when a norm (magnitude) of a specific component (for example, dz/dt, dθ/dt) out of the components of the state variable vector X(t) is set to be larger than the norm of another component (for example, z, θ), the component of which norm is set to be larger is relatively more stably converged. Also, when a value of the component of Q is set to be larger, transient property is critical, that is to say, the value of the state variable vector X(t) is rapidly converged to a stable value, and when the value of R is set to be larger, consumption energy is decreased.

In an actual sprung vibration-damping control of the sprung vibration-damping control device of the first embodiment, as illustrated in FIG. 3, the state variable vector X(t) is calculated by solving the differential equation of the equation 2a by using the torque input value in the motion model unit 3e. Subsequently, in the FF secondary regulator unit 3f and the FB secondary regulator unit 3h, U(t) is obtained by multiplying the gain K by the state variable vector X(t) being the output of the motion model unit 3e. The gain K is determined so as to converge the state variable vector X(t) to 0 or the minimum value. Also, U(t) obtained by the FF secondary regulator unit 3f and the FB secondary regulator unit 3h are the FF system vibration-damping torque compensation amount U·FF and the FB system vibration-damping torque compensation amount U·FB. Further, herein, the FF control changing unit 3i change (corrects) the FF system vibration-damping torque compensation amount U·FF by the multiplication of the FF control gain K·FF, and the FB control changing unit 3k changes (corrects) the FB system vibration-damping torque compensation amount U·FB by the multiplication of the FB control gain K·FB. Subsequently, the changed (corrected) FF system vibration-damping torque compensation amount U·FF and the FB system vibration-damping torque compensation amount U·FB are converted to the unit of the requested torque (driving torque) of the vehicle drive device, and subtracted from the control command (requested throttle opening, requested ignition timing, requested fuel injection amount or requested current amount) corresponding to the driver requested torque by the adder 2c. The system represented by the equations 1a and 1b is a resonance system, and a value of the state variable vector is substantially only a component of a frequency inherent to the system for an optional input. Therefore, by configuring such that (the converted value of) U(t) is subtracted from the control command corresponding to the driver requested torque, the component of the frequency inherent to the system out of the driver requested torque, that is to say, a component, which allows the sprung vibration to occur in the vehicle body, is corrected, thereby suppressing the sprung vibration. When the component of the frequency inherent to the system disappears from the requested torque provided from the driver, the component of the frequency inherent to the system out of the driver requested torque command input to the vehicle drive device is only −U(t), and the vibration by Tw (disturbance) is converged.

Figure 5:
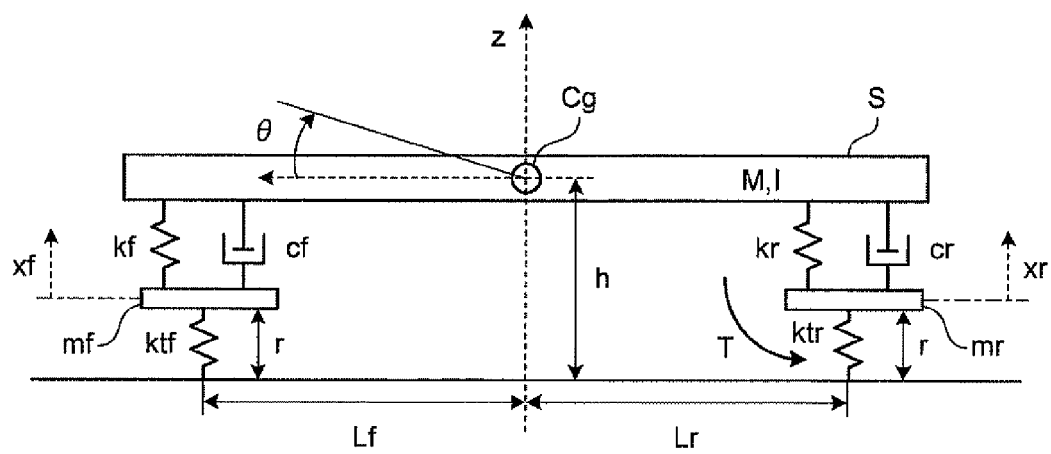
FIG. 5 is a view explaining another example of the mechanical motion model of the sprung vibration supposed in the vehicle controlling apparatus according to the present invention.

Herein, as the mechanical motion model in the bounce direction and the pitch direction of the vehicle body, a model, which takes into account spring elasticity of tires of the front wheel and the rear wheel (sprung and unsprung vibration model of vehicle body) may be adopted in addition to the configuration in FIG. 4, for example, as illustrated in FIG. 5. When each of the tires of the front wheel and the rear wheel has elastic coefficients ktf, ktr, as is clear from FIG. 5, the motion equation in the bounce direction and the motion equation in the pitch direction of the center of gravity of the vehicle body can be represented as following equations 4a to 4d.

[Equation 4]

$$M\frac{d^2 z}{dt^2} = -kf(z + Lf \cdot \theta - xf) - cf\left(\frac{dz}{dt} + Lf \cdot \frac{d\theta}{dt} - \frac{dxf}{dt}\right) - \qquad (4a)$$
$$kf(z - Lf \cdot \theta - xr) - cr\left(\frac{dz}{dt} - Lr \cdot \frac{d\theta}{dt} - \frac{dxr}{dt}\right)$$

$$I\frac{d^2 \theta}{dt^2} = -Lf\left\{kf(z + Lf \cdot \theta - xf) + cf\left(\frac{dz}{dt} + Lf \cdot \frac{d\theta}{dt} - \frac{dxf}{dt}\right)\right\} + \qquad (4b)$$
$$Lr\left\{kr(z - Lr \cdot \theta - xr) + cr\left(\frac{dz}{dt} - Lr \cdot \frac{d\theta}{dt} - \frac{dxr}{t}\right)\right\} + \frac{h}{r} \cdot T$$

$$mf\frac{d^2 xf}{dt^2} = kf(z + Lf \cdot \theta - xf) + cf\left(\frac{dz}{dt} + Lf \cdot \frac{d\theta}{dt} - \frac{dxf}{dt}\right) + ktf \cdot xf \qquad (4c)$$

$$mr\frac{d^2 xr}{dt^2} = kr(z - Lr \cdot \theta - xr) + cr\left(\frac{dz}{dt} - Lr \cdot \frac{d\theta}{dt} - \frac{dxr}{dt}\right) + ktr \cdot xr \qquad (4d)$$

In each of the equations, "xf and xr" are unsprung discharge amounts of the front wheel and the rear wheel, respectively, and "mf and mr" are unsprung masses of the front wheel and the rear wheel, respectively. The equations 4a to 4d compose the state equation as the above-described equation 2a same as in the case illustrated in FIG. 4 by setting z, θ, xf, xr and time differential values thereof as the state variable vector (matrix A has 8 rows and 8 columns and matrix B has 8 rows and 1 column), and can determine the gain matrix K, which converges magnitude of the state variable vector to 0 according to the theory of the optimal regulator. The actual sprung vibration-damping control in this case is also similar to that in the case in FIG. 4.

Herein, although it is possible to configure the feedback control system 3B of the vehicle body vibration-damping controlling unit 3 in FIG. 3 to actually detect the wheel torque input as the disturbance by providing a torque sensor on each of the wheels $W_{FL}$, $W_{FR}$, $W_{RL}$ and $W_{RR}$, for example, the wheel torque estimated value Tw estimated by the wheel torque estimating unit 3g from another detectable value in the traveling vehicle 10 is herein used.

The wheel torque estimated value Tw can be estimated or calculated by a following equation 5 by using temporal differentiation of the wheel speed ω or a wheel speed value r·ω obtained by wheel speed obtaining means $61_{RL}$ and $61_{RR}$ of the driving wheels $W_{RL}$ and $W_{RR}$, respectively, for example. In the equation 5, "M" represents the mass of the vehicle and "r" represents the wheel radius.

$$Tw = M \cdot r^2 \cdot d\omega/dt \qquad \ldots (5)$$

Herein, when the sum of the driving force generated in the driving wheels $W_{RL}$ and $W_{RR}$ at a grounding site on the road surface is equal to total driving force M·Ga (Ga is acceleration) of the vehicle 10, the wheel torque estimated value Tw is obtained by a following equation 5a.

$$Tw = M \cdot Ga \cdot r \qquad \ldots (5a)$$

Also, the acceleration Ga of the vehicle 10 is obtained by a following equation 5b by a differential value of the wheel speed value r·ω.

$$Ga = r \cdot d\omega/dt \qquad \ldots (5b)$$

Therefore, the wheel torque estimated value Tw is estimated as the above-described equation 5.

Under the above-described predetermined requirement, by resonance of the drive system (in the vehicle 10, this corresponds to the transmission 30, the propeller shaft 51, the differential device 52 and the drive shafts $53_{RL}$ and $53_{RR}$), a high-frequency component of the road surface input is superimposed on the wheel speed ω of the driving wheels $W_{RL}$ and $W_{RR}$ detected by the wheel speed obtaining means $61_{RL}$ and $61_{RR}$, or deviation occurs in the detected value itself. The vehicle controlling apparatus of the first embodiment performs the feedback control by using the wheel speed ω as described above, therefore, the control amount of the vehicle body vibration-damping control (hereinafter, referred to as "vehicle body vibration-damping control amount") is set to be higher than its original value, so that final requested output torque of the power source obtained by adding the vehicle body vibration-damping control amount is also set to be too large, and actual output torque becomes larger than the requested output torque of the power source originally required when executing the vehicle body vibration-damping control.

Therefore, the vehicle controlling apparatus of the first embodiment is configured to judge whether the drive system resonates with the execution of the vehicle body vibration-damping control, and to inhibit the vehicle body vibration-damping control when the drive system is judged to resonate. Therefore, the vehicle controlling apparatus (electronic control unit 1) is provided with drive system resonance judging means to judge this and vehicle body vibration-damping control inhibiting means for inhibiting the vehicle body vibration-damping control according to a judgment result.

It is judged whether the drive system resonates by comparing a change predicted value of the vehicle body vibration-damping control amount within a predetermined period (hereinafter, referred to as "vehicle body vibration-damping control amount change period) t0 when executing the vehicle body vibration-damping control with a change amount of the output value actually output on a vehicle 10 side with the execution of the vehicle body vibration-damping control by the vehicle body vibration-damping control amount within the vehicle body vibration-damping control amount change period t0 (hereinafter, referred to as "actual output value change amount"), for example. That is to say, when the actual output value change amount is larger than the change predicted value of the vehicle body vibration-damping control amount, it may be said that unexpected torque acts on the drive system, so that the drive system resonance judging means is allowed to judge that the drive system resonates when the actual output value change amount is larger than the change predicted value of the vehicle body vibration-damping control amount.

As the change predicted value of the vehicle body vibration-damping control amount, difference between a maximum vehicle body vibration-damping control amount and a minimum vehicle body vibration-damping control amount to be output from now for executing the vehicle body vibration-damping control is used, for example. The vehicle body vibration-damping control amount of the first embodiment is the vehicle body vibration-damping control compensation wheel torque obtained by adding the FF system vibration-damping torque compensation amount U·FF and the FB system vibration-damping torque compensation amount U·FB by the adder 3b of the above-described vehicle body vibration-damping controlling unit 3, or the final vehicle body vibration-damping control compensation torque (total vehicle body vibration-damping control compensation amount) obtained by converting the vehicle body vibration-damping control compensation wheel torque to the unit of the requested torque (driving torque) of the vehicle drive device by the driving torque converting unit 3c of the vehicle body vibration-damping controlling unit 3. Therefore, the change predicted value of the vehicle body vibration-damping control amount is specifically difference between a maximum value and a minimum value of the vehicle body vibration-damping control compensation wheel torque or the final vehicle body vibration-damping control compensation torque in the vehicle body vibration-damping control to be executed from now, that is to say, a change predicted value of the vehicle body vibration-damping control compensation wheel torque or the final vehicle body vibration-damping control compensation torque. The change predicted value of the vehicle body vibration-damping control compensation wheel torque is, more specifically, difference between a maximum value Tpmax and a minimum value Tdmin of the requested wheel torque for the vehicle body vibration-damping control for the driving wheels. $W_{RL}$ and $W_{RR}$ within the vehicle body vibration-damping control amount change period t0, that is to say, a predicted wheel torque change amount $\Delta Td(=Tdmax-Tdmin)$ of the driving wheels $W_{RL}$ and $W_{RR}$. Also, the change predicted value of the vehicle body vibration-damping control compensation wheel torque is also difference between a maximum value Tpmax and a minimum value Tpmin of the requested output torque for the vehicle body vibration-damping control for the vehicle drive device (power source) within the vehicle body vibration-damping control amount change period t0, that is to say, a predicted output torque change amount $\Delta Tp(=Tpmax-Tpmin)$ of the power source. Meanwhile, that obtained by converting the final vehicle body vibration-damping control compensation torque to the vehicle body vibration-damping control command to the vehicle drive device by the vehicle body vibration-damping control command determining unit 3d may be used as the vehicle body vibration-damping control amount.

Also, the actual output value change amount within the vehicle body vibration-damping control amount change period t0 is the change amount of the output value actually output by the vehicle drive device (power source) with the execution of the vehicle body vibration-damping control with the vehicle body vibration-damping control amount within the period, for example, and difference between the actual output value according to the maximum vehicle body vibration-damping control amount and the actual output value according to the minimum vehicle body vibration-damping control amount within the period. That is to say, the actual output value change amount is obtained as the difference between the maximum value Tpamax and the minimum value Tpamin of the actual output torque of the power source actually output according to a maximum value and a minimum value of the final vehicle body vibration-damping control compensation torque, and is an actual output torque change amount $\Delta Tpa(=Tpamax-Tpamin)$ of the power source. Herein, as the actual output value change amount, the change amount of the output value actually output in the driving wheels $W_{RL}$ and $W_{RR}$ by the execution of the vehicle body vibration-damping control with the vehicle body vibration-damping control amount within the vehicle body vibration-damping control amount change period t0 may be used. The actual output value change amount in this case is obtained as the difference between the maximum value Tdamax and the minimum value Tdamin of actual wheel torque of the driving wheels $W_RL$ and $W_{RR}$ actually output according to the maximum value and the minimum value of final vehicle body vibration-damping control compensation wheel torque, and is an actual wheel torque change amount $\Delta Tda(=Tdamax-Tdamin)$ of the driving wheels $W_{RL}$ and $W_{RR}$.

Herein, since the vehicle body vibration-damping control amount can be obtained by calculation as described above, the change predicted value of the vehicle body vibration-damping control amount (predicted output torque change amount $\Delta Tp$ of power source and predicted wheel torque change amount $\Delta Td$ of driving wheels $W_{RL}$ and $W_{RR}$) within the vehicle body vibration-damping control amount change period t0 can also be calculated. On the other hand, the actual output torque of the power source and the actual wheel torque of the driving wheels $W_{RL}$ and $W_{RR}$ cannot be detected unless torque detecting means such as the torque sensor, which increases a cost, is separately prepared. Although the actual output torque of the power source and the actual wheel torque of the driving wheels $W_{RL}$ and $W_{RR}$ can also be obtained by using well-known estimating means, an appropriate comparison cannot be performed unless estimation accuracy thereof is high. Therefore, in the first embodiment, a predicted output shaft rotational number change amount $\Delta Np$ of the power source corresponding to the predicted output torque change amount $\Delta Tp$ of the power source and an actual output shaft rotational number change amount $\Delta Npa$ of the power source corresponding to the actual output torque change amount $\Delta Tpa$ of the power source are compared with each other, and when the actual output shaft rotational number change amount $\Delta Npa$ is larger than the predicted output shaft rotational number change amount $\Delta Np$, it is judged that the drive system resonates. The predicted output shaft rotational number change amount $\Delta Np$ can be obtained by calculation to be described later. Also, as for the actual output shaft rotational number change amount $\Delta Npa$, a detection result of output shaft rotational number detecting means 62 for detecting the rotational number of the output shaft of the power source may be used. The output shaft rotational number detecting means 62 is a so-called crank angle sensor when the power source is the engine 20, for example.

The vehicle controlling apparatus (electronic control unit 1) of the first embodiment is also provided with vehicle body vibration-damping control returning means for returning the vehicle body vibration-damping control under a predetermined requirement inhibited by the vehicle body vibration-damping control inhibiting means. For example, when an operation range of the power source deviates from the operation range when inhibiting the vehicle body vibration-damping control, it is possible to estimate that the resonance of the drive system disappears and return the vehicle body vibration-damping control. Meanwhile, even when the drive system actually still resonates after the return, the vehicle body vibration-damping control can be inhibited again by performing the above-described comparison judgment again.

A case in which the operation range deviates is, for example, a case in which a control condition of the drive system, that is to say, the gear position (or gear ratio) of the transmission 30 is changed, a case in which an average value $\Delta$Npave of the output shaft rotational number change amount of the power source within a predetermined period t1 is smaller than a predetermined value $\Delta$Np0. Information of a so-called shift position sensor 31 may be used as the change in the gear position. Also, the output shaft rotational number change amount when the drive system resonates is obtained by experiment and simulation, for example, and a value smaller than the calculation result may be applied as the predetermined value $\Delta$Np0. Also, a period sufficient for judging at least presence or absence of the resonance of the drive system may be set as the predetermined period t1.

Figure 6:
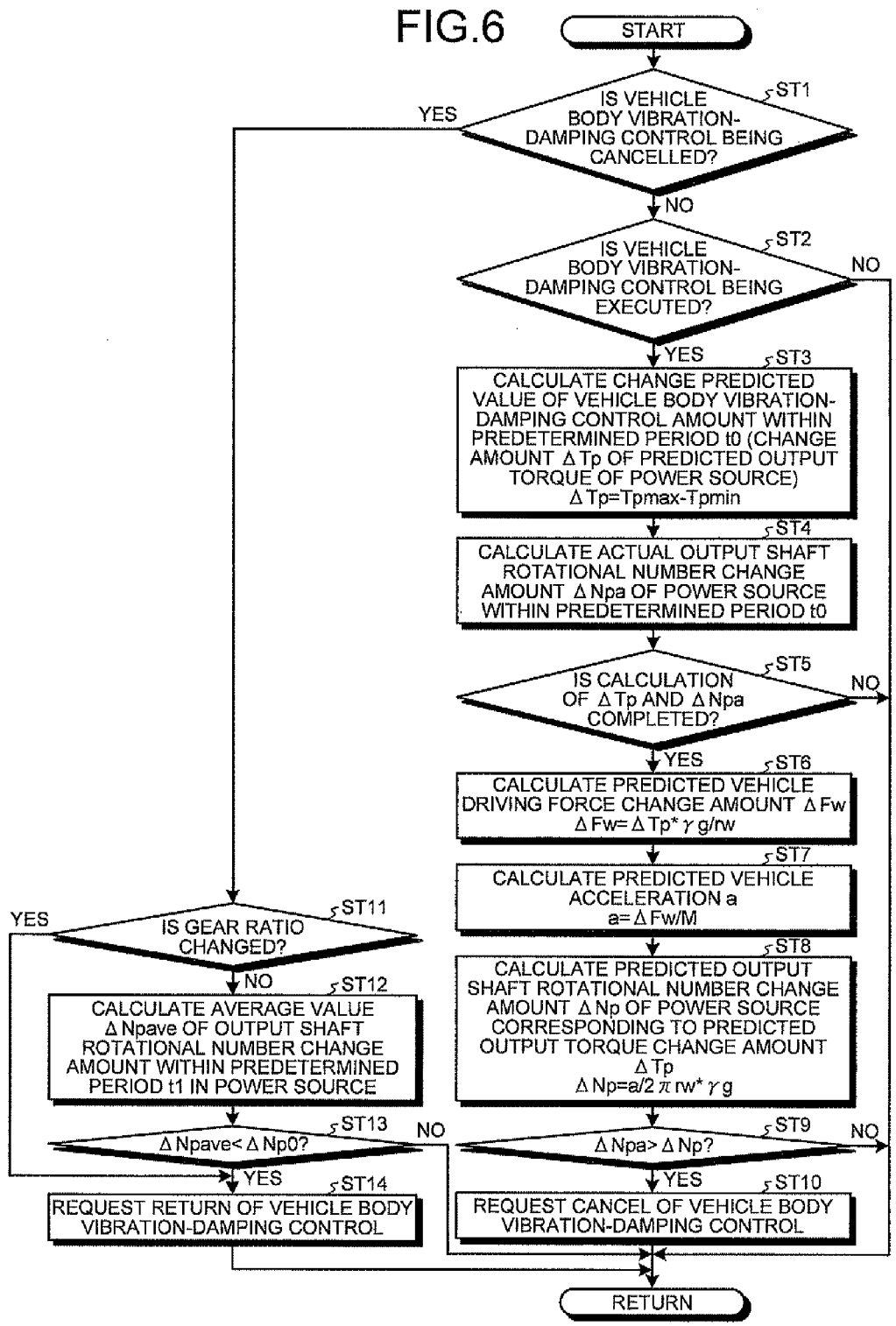
FIG. 6 is a flowchart for explaining an example of inhibiting operation and returning operation of the vehicle body vibration-damping control of a first embodiment in the vehicle controlling apparatus according to the present invention.

An example of inhibiting operation and returning operation of the vehicle body vibration-damping control in the vehicle controlling apparatus of the first embodiment is hereinafter described with reference to a flowchart in FIG. 6. Meanwhile, it is assumed that the vehicle controlling apparatus is normally in a stand-by state waiting for the execution of the vehicle body vibration-damping control so as to be able to immediately execute the vehicle body vibration-damping control when necessary.

First, the drive system resonance judging means of the vehicle controlling apparatus (electronic control unit 1) judges whether the vehicle body vibration-damping control is in an inhibited state (that is to say, whether the vehicle body vibration-damping control is being canceled) (step ST1).

When the drive system resonance judging means judges that the vehicle body vibration-damping control is not being canceled at the step ST1, this judges whether the vehicle body vibration-damping control is being executed (step ST2). Herein, when the vehicle body vibration-damping control is not executed, this calculation processing operation is terminated once and the procedure returns to the step ST1.

When it is judged that the vehicle body vibration-damping control is being executed at the step ST2, the drive system resonance judging means obtains the change predicted value of the vehicle body vibration-damping control amount when executing the vehicle body vibration-damping control within the vehicle body vibration-damping control amount change period (predetermined period) t0 (step ST3).

Figure 7:
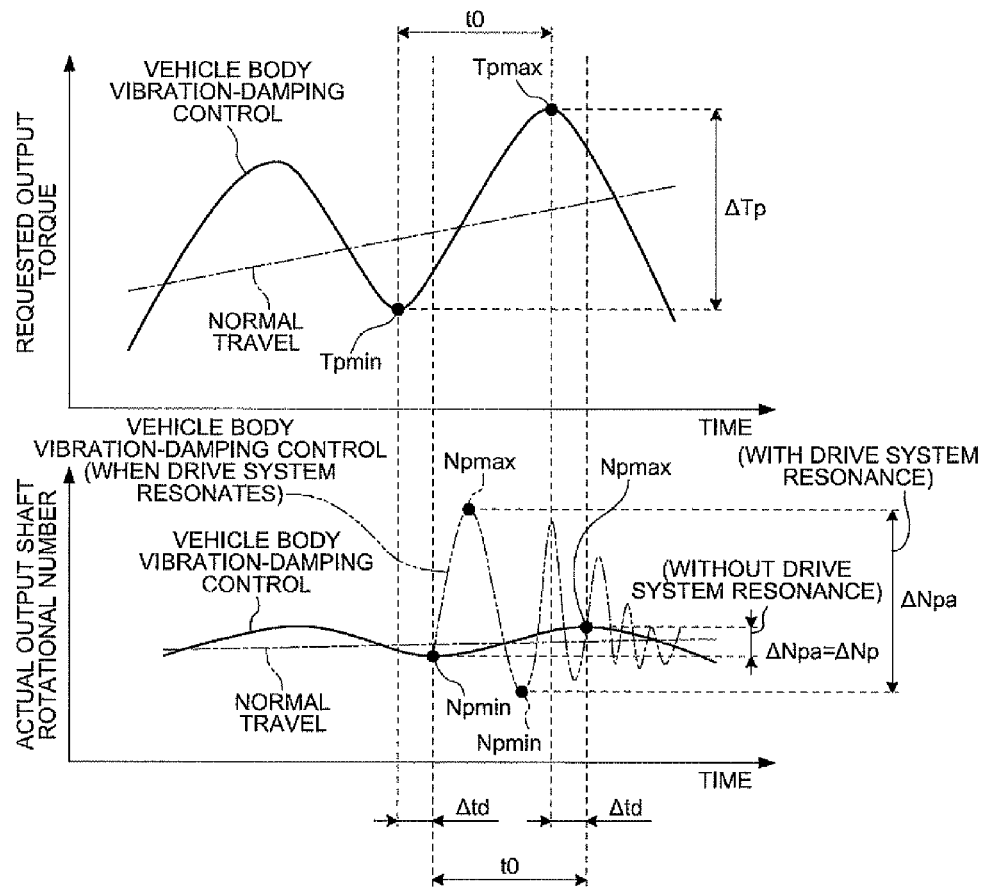
FIG. 7 is a view for explaining relationship between requested output torque and an actual output rotational number of a power source related to the vehicle body vibration-damping control.

Herein, the difference between the maximum requested output torque Tpmax and the minimum requested output torque Tpmin to the power source for the vehicle body vibration-damping control illustrated in FIG. 7 is obtained to obtain the predicted output torque change amount $\Delta$Tp of the power source for the vehicle body vibration-damping control (that is to say, the above-described change predicted value of final vehicle body vibration-damping control compensation torque). The predicted output torque change amount $\Delta$Tp is the change amount of the output torque predicted to be output from the engine 20 with the vehicle body vibration-damping control when the power source is the engine 20, and the change amount of the output torque predicted to be output from the motor with the vehicle body vibration-damping control when the power source is the motor. Herein, when the power source is the engine 20 and this is the diesel engine, it is possible to obtain difference between a maximum value and a minimum value of the requested fuel injection amount and convert the difference to the torque, thereby obtaining the predicted output torque change amount $\Delta$Tp. Meanwhile, in an upper part in FIG. 7, a solid line indicates the requested output torque to the power source for the vehicle body vibration-damping control and a dashed-dotted line indicates the above-described normal travel request output torque of the power source.

Also, the drive system resonance judging means obtains the actual output shaft rotational number change amount $\Delta$Npa of the power source within the vehicle body vibration-damping control amount change period t0 (step ST4).

In general, the actual output shaft rotational number of the power source changes with a delay of a predetermined time after the power source is instructed to generate the requested output torque. That is to say, there is a phase delay $\Delta$td illustrated in FIG. 7 between the actual output shaft rotational number and the requested output torque of the power source. Therefore, the drive system resonance judging means detects a minimum value Npmin of the actual output shaft rotational number corresponding to the minimum requested output torque Tpmin to the power source and a maximum value Npmax of the actual output shaft rotational number corresponding to the maximum requested output torque Tpmax based on a detection signal of the output shaft rotational number detecting means 62, which takes into account the phase delay $\Delta$td. Then, the drive system resonance judging means obtains difference between the maximum value Npmax and the minimum value Npmin of the actual output shaft rotational number to obtain the actual output shaft rotational number change amount $\Delta$Npa(=Npmax−Npmin) of the power source associated with the execution of the vehicle body vibration-damping control within the vehicle body vibration-damping control amount change period t0. In a lower part in FIG. 7, the actual output shaft rotational number associated with the execution of the vehicle body vibration-damping control when the drive system does not resonate is indicated by a solid line, and the actual output shaft rotational number with the execution of the vehicle body vibration-damping control when the drive system resonates is indicated by a dashed-two dotted line. Also, in the lower part in FIG. 7, a dashed-dotted line indicates the actual output shaft rotational number in normal travel. At the step ST4, the actual output shaft rotational number change amount $\Delta$Npa when the drive system resonates is obtained as a numeric value larger than the actual output shaft rotational number change amount $\Delta$Npa when the drive system does not resonate.

The drive system resonance judging means judges whether the calculation of the predicted output torque change amount $\Delta$Tp of the power source for the vehicle body vibration-damping control and the actual output shaft rotational number change amount $\Delta$Npa of the power source within the vehicle body vibration-damping control amount change period (predetermined period) t0 is completed (step ST5). Herein, when the calculation of both is not terminated, the calculation processing operation is terminated once and the procedure returns to the step ST1.

When it is judged that the calculation is completed at the step ST5, the drive system resonance judging means obtains the predicted vehicle driving force change amount $\Delta$Fw of the power source by using the predicted output torque change amount $\Delta$Tp (step ST6). The predicted vehicle driving force change amount $\Delta$Fw is the change amount of the vehicle driving force predicted when the power source generates the output torque corresponding to the predicted output torque change amount $\Delta$Tp. The predicted vehicle driving force change amount $\Delta$Fw is as large as the change amount of the wheel torque of the driving wheels $W_{RL}$ and $W_{RR}$ predicted when the power source generates the output torque corresponding to the predicted output torque change amount ΔTp, so that this is calculated by using a following equation 6. "γg" in the equation 6 represents a gear ratio obtained by a current gear ratio in the transmission 30 and a final reduction ratio in the differential device 52, and "rw" represents the wheel radius of the driving wheels $W_{RL}$ and $W_{RR}$.

$$\Delta Fw = \Delta Tp * \gamma g / rw \quad \ldots (6)$$

Subsequently, the drive system resonance judging means calculates predicted vehicle acceleration a by using the predicted vehicle driving force change amount ΔFw (step ST7). The predicted vehicle acceleration a is vehicle acceleration predicted to act when the driving force corresponding to the predicted vehicle driving force change amount ΔFw acts on the vehicle 10 and is calculated by using a following equation 7. Meanwhile, "M" in the equation 7 represents the mass of the vehicle.

$$a = \Delta Fw / M \quad \ldots (7)$$

Then, the drive system resonance judging means obtains the predicted output shaft rotational number change amount ΔNp of the power source corresponding to the predicted output torque change amount ΔTp by substituting the predicted vehicle acceleration a into a following equation 8 (step ST8). That is to say, herein, wheel angle acceleration predicted in the driving wheels $W_{RL}$ and $W_{RR}$ is obtained based on the predicted vehicle acceleration a, and the change amount of the output shaft rotational number of the power source at that time is obtained by using the same. The predicted output shaft rotational number change amount ΔNp of the power source is the change amount of the output shaft rotational number of the power source within the vehicle body vibration-damping control amount change period t0 predicted when the power source generates the output torque corresponding to the predicted output torque change amount ΔTp.

$$\Delta Np = a / 2\pi rw * \gamma g \quad \ldots (8)$$

Figure 8:
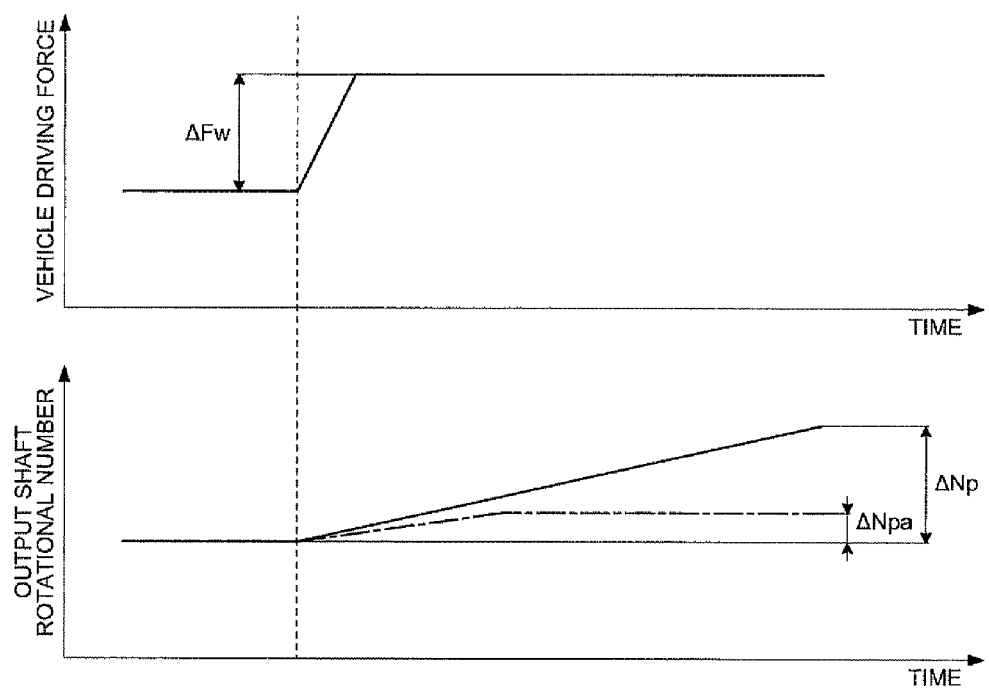
FIG. 8 is a view for explaining relationship between a predicted output shaft rotational number change amount $\Delta Np$ and an actual output shaft rotational number change amount $\Delta Npa$ of the power source when increasing driving force corresponding to a predicted vehicle driving force change amount $\Delta Fw$.

Herein, when the vehicle 10 increases the driving force corresponding to the predicted vehicle driving force change amount ΔFw, the output shaft rotational number of the power source increases as illustrated in FIG. 8. A solid line in FIG. 8 indicates the predicted output shaft rotational number change amount ΔNp of the power source corresponding to the predicted output torque change amount ΔTp (in other words, predicted vehicle driving force change amount ΔFw) calculated by the above-described equation 8. The calculated predicted output shaft rotational number change amount ΔNp remains increasing with the predicted vehicle acceleration a as a proportionality coefficient. However, various resistances such as a travel resistance and a frictional resistance of gear and the like act in the actual vehicle 10, so that the output shaft rotational number of the power source increases to be substantially constantly stable at a certain point balanced with the resistances as indicated by a dashed-dotted line in FIG. 8. That is to say, when the vehicle 10 increases the driving force corresponding to the predicted vehicle driving force change amount ΔFw, the actual output shaft rotational number change amount ΔNpa of the power source associated with the increase does not become larger than the predicted output shaft rotational number change amount ΔNp. Therefore, when the actual output shaft rotational number change amount ΔNpa is larger than the predicted output shaft rotational number change amount ΔNp, it may be said that the drive system resonates and the output shaft rotational number increases by the resonance.

Therefore, the drive system resonance judging means of the first embodiment compares the actual output shaft rotational number change amount ΔNpa of the power source within the vehicle body vibration-damping control amount change period t0 with the predicted output shaft rotational number change amount ΔNp of the power source within the vehicle body vibration-damping control amount change period t0 and judges whether the actual output shaft rotational number change amount ΔNpa becomes larger than the predicted output shaft rotational number change amount ΔNp, thereby judging presence or absence of the resonance of the drive system (step ST9).

When it is judged that the actual output shaft rotational number change amount ΔNpa is not larger than the predicted output shaft rotational number change amount ΔNp at the step ST9, the drive system resonance judging means judges that the drive system does not resonate and terminates the calculation processing operation once, and the procedure returns to the step ST1.

On the other hand, when it is judged that the actual output shaft rotational number change amount ΔNpa is larger than the predicted output shaft rotational number change amount ΔNp at the step ST9, the drive system resonance judging means judges that the drive system resonates and passes the process to the vehicle body vibration-damping control inhibiting means. Since it is judged that the drive system resonates, the vehicle body vibration-damping control inhibiting means performs a vehicle body vibration-damping control cancel request and prevents the vehicle body vibration-damping control from being executed (step ST10).

According to this, when the drive system resonates, the vehicle body vibration-damping control based on the information of the wheel speed ω on which the noise (high-frequency component) is superimposed or with deviation is not executed, so that it becomes possible to prevent deterioration of driving quality by occurrence of a feeling of roughness due to excessive suppression of pitching motion of the vehicle body and occurrence of the vibration back and forth of the vehicle.

When the vehicle body vibration-damping control is being canceled, the drive system resonance judging means performs positive judgment (judgment that vehicle body vibration-damping control is being canceled) at the above-described step ST1. At that time, the drive system resonance judging means passes the process to the vehicle body vibration-damping control returning means. Then, the vehicle body vibration-damping control returning means judges whether the gear position of the transmission 30 is changed based on a signal received from the shift position sensor 31 (step ST11).

Herein, when it is judged that the gear position is not changed, the vehicle body vibration-damping control returning means next obtains the average value ΔNpave of the output shaft rotational number change amount within the predetermined period t1 of the power source based on the detection signal of the output shaft rotational number detecting means 62 (step ST12). Then, the vehicle body vibration-damping control returning means compares the average value ΔNpave of the output shaft rotational number change amount with the above-described predetermined value ΔNp0 to judge whether the average value ΔNpave becomes smaller than the predetermined value ΔNp0 (step ST13).

When it is judged that the average value ΔNpave of the output shaft rotational number change amount is not smaller than the predetermined value ΔNp0 at the step ST 13, the vehicle body vibration-damping control returning means judges that the resonance of the drive system is continued and terminates the calculation processing operation once, and the procedure returns to the step ST1.

On the other hand, when it is judged that the average value ΔNpave of the output shaft rotational number change amount is smaller than the predetermined value ΔNp0 at the step ST13, the vehicle body vibration-damping control returning means judges that the resonance of the drive system disappears and performs a vehicle body vibration-damping control returning request such that the normal appropriate vehicle body vibration-damping control is immediately executed when necessary (step ST14). When it is judged that the gear position of the transmission 30 is changed at the above-described step ST11 also, the vehicle body vibration-damping control returning means performs the vehicle body vibration-damping control returning request at the step ST14.

In this manner, since the vehicle body control device of the first embodiment does not execute the vehicle body vibration-damping control using the information of the wheel speed co on which the noise (high-frequency component) is superimposed or with the deviation when the drive system resonates, it is possible to prevent the deterioration of the driving quality by the occurrence of the roughness due to the excessive suppression of the pitching motion of the vehicle body and the occurrence of the vibration back and forth of the vehicle.

[Second Embodiment]

A second embodiment of the vehicle controlling apparatus according to the present invention is described with reference to FIGS. 9 to 10.

The vehicle controlling apparatus of the second embodiment is obtained by replacing the vehicle body vibration-damping control inhibiting means with vehicle body vibration-damping control amount adjusting means in the above-described vehicle controlling apparatus of the first embodiment or by providing the vehicle body vibration-damping control amount adjusting means together with the vehicle body vibration-damping control inhibiting means.

The vehicle body vibration-damping control amount adjusting means is for adjusting in a direction in which the vehicle body vibration-damping control is suppressed, that is to say, for decreasing a set value of the vehicle body vibration-damping control (set vehicle body vibration-damping control amount) in a direction to suppress a suppression effect of the sprung vibration by the vehicle body vibration-damping control when it is judged that the drive system resonates with the execution of the vehicle body vibration-damping control.

The set value of the vehicle body vibration-damping control (set vehicle body vibration-damping control amount) is the vehicle body vibration-damping control compensation wheel torque obtained by adding the FF system vibration-damping torque compensation amount U·FF and the FB system vibration-damping torque compensation amount U·FB by the adder 3b of the vehicle body vibration-damping controlling unit 3 in the first embodiment, the final vehicle body vibration-damping control compensation torque obtained by converting the vehicle body vibration-damping control compensation wheel torque to the unit of the requested torque (driving torque) of the vehicle drive device by the driving torque converting unit 3c of the vehicle body vibration-damping controlling unit 3 (total vehicle body vibration-damping control compensation amount) or that obtained by converting the final vehicle body vibration-damping control compensation torque to the vehicle vibration-damping control command to the vehicle drive device by the vehicle body vibration-damping control command determining unit 3d.

The vehicle body vibration-damping control amount adjusting means is configured to correct at least any one gain out of the gain K in the FF secondary regulator unit 3f, the gain K in the FB secondary regulator unit 3h, the FF control gain K·FF set by the FF control gain setting unit 3j and the FB control gain K·FB set by the FB control gain setting unit 3l described in the first embodiment when it is judged that the drive system resonates with the execution of the vehicle body vibration-damping control with the set value, thereby decreasing the set vehicle body vibration-damping control amount.

Also, it is configured such that if the vehicle body vibration-damping control amount adjusting means decreases the set vehicle body vibration-damping control amount once, this gradually returns the vehicle body vibration-damping control amount to the set value when the resonance of the drive system disappears thereafter, thereby executing the normal vehicle body vibration-damping control (that is to say, that when the vehicle body vibration-damping control amount is not decreased by the vehicle body vibration-damping control amount adjusting means). That is to say, the vehicle body vibration-damping control amount adjusting means is configured to also have a function as the vehicle body vibration-damping control returning means for gradually returning the vehicle body vibration-damping control to the normal vehicle body vibration-damping control.

For example, the vehicle body vibration-damping control amount adjusting means may multiply a predetermined correction coefficient A1 (0<A1<1.0) by the gain to be corrected now being set to decrease the gain when it is judged that the drive system resonates with the execution of the vehicle body vibration-damping control with the set value, thereby decreasing the vehicle body vibration-damping control amount, or may subtract a predetermined correction value B1 (B1>0) smaller than the gain from the gain to be corrected now being set to decrease the gain, thereby decreasing the vehicle body vibration-damping control amount. The correction coefficient A1 and the correction value B1 may be set in advance or may be changed according to difference between the change predicted value of the vehicle body vibration-damping control amount (predicted output torque change amount ΔTp of power source and predicted wheel torque change amount ΔTd of driving wheels $W_{RL}$ and $W_{RR}$) and the actual output value change amount (actual output torque of power source, actual wheel torque of driving wheels $W_{RL}$, $W_{RR}$) within the vehicle body vibration-damping control amount change period t0, for example, difference between the predicted output shaft rotational number change amount ΔNp and the actual output shaft rotational number change amount ΔNpa in the power source. In the latter case, the correction coefficient A1 and the correction value B1 are made smaller such that a decrease amount of the vehicle body vibration-damping control amount becomes larger as the difference is larger.

Also, the vehicle body vibration-damping control amount adjusting means may multiply a predetermined correction coefficient A2 (A2>1.0) by the current gain to increase the gain when returning the vehicle body vibration-damping control to the normal vehicle body vibration-damping control, thereby increasing the vehicle body vibration-damping control, amount, or may add a predetermined correction value B2 (0<B2<1.0) to the current gain to increase the gain, thereby increasing the vehicle body vibration-damping control amount. The correction coefficient A2 and the correction value B2 are set in advance. An upper limit of the increase in the vehicle body vibration-damping control amount is the currently set vehicle body vibration-damping control amount.

Hereinafter, an example of adjusting operation of the vehicle body vibration-damping control amount in the vehicle controlling apparatus of the second embodiment is described with reference to a flowchart in FIG. 9. Although, an example in which the gain K in the FB secondary regulator unit 3h of the feedback control system 3B is corrected is herein described, similar calculation process may be performed also when this is applied to another gain.

First, the drive system resonance judging means of the vehicle controlling apparatus (electronic control unit 1) judges whether the vehicle body vibration-damping control is being executed (step ST2). Herein, when the vehicle body vibration-damping control is not executed, the calculation processing operation is terminated once and the procedure returns to the step ST2.

On the other hand, when it is judged that the vehicle body vibration-damping control is being executed at the step ST2, the drive system resonance judging means executes the calculation process at steps ST3 to ST9 as in the first embodiment (steps ST3 to ST9).

The drive system resonance judging means of the second embodiment passes a following calculation process to the vehicle body vibration-damping control amount adjusting means regardless of a result of comparison judgment of the actual output shaft rotational number change amount ΔNpa of the power source within the vehicle body vibration-damping control amount change period t0 with the predicted output shaft rotational number change amount ΔNp of the power source within the vehicle body vibration-damping control amount change period t0 at the step ST9.

When it is judged that the actual output shaft rotational number change amount ΔNpa is larger than the predicted output shaft rotational number change amount ΔNp (positive judgment) at the step ST9, that is to say, when it is judged that the drive system resonates, the vehicle body vibration-damping control amount adjusting means performs the correction to decrease the currently set gain K of the FB secondary regulator unit 3h (step ST21). Herein, a gain K(n) of this time is calculated by multiplying the correction coefficient A1 (0<A1<1.0) by a previous gain K(n−1) by using a following equation 9 (n=1, 2, 3 ... ). For example, an initial set value of the gain K (that is to say, a value when the calculation process by the vehicle body vibration-damping control amount adjusting means is not involved) is herein set to "K0".

$$K(n)=K(n-1)*A1 \quad \ldots (9)$$

According to this, in the FB secondary regulator unit 3h, the FB system vibration-damping torque compensation amount U·FB as the correction amount of the driver requested wheel torque Tw0, which converges the state variable transmitted from the motion model unit 3e to the minimum value, is calculated based on the decreased gain K{=K(n)} after the correction. That is to say, the FB system vibration-damping torque compensation amount U·FE becomes smaller than that calculated based on the gain K{=K(n−1)} before the correction. Therefore, at the time of the correction, the vehicle body vibration-damping control compensation wheel torque obtained by adding the FF system vibration-damping torque compensation amount U·FF and the FB system vibration-damping torque compensation amount U·FB by the adder 3b, the final vehicle body vibration-damping control compensation torque obtained by converting the vehicle body vibration-damping control compensation wheel torque to the unit of the requested torque (driving torque) of the vehicle drive device by the driving torque converting unit 3c of the vehicle body vibration-damping controlling unit 3 (total vehicle body vibration-damping control compensation amount) and that obtained by converting the final vehicle body vibration-damping control compensation torque to the vehicle body vibration-damping control command to the vehicle drive device by the vehicle body vibration-damping control command determining unit 3d, that is to say, the vehicle body vibration-damping control amount becomes smaller than that when executing the normal vehicle body vibration-damping control (that when the vehicle body vibration-damping control amount is not decreased by the vehicle body vibration-damping control amount adjusting means). Therefore, in the vehicle body vibration-damping control at that time, the suppression effect of the sprung vibration becomes smaller than that when executing the normal vehicle body vibration-damping control.

The vehicle body vibration-damping control amount adjusting means repeats decreasing correction of the gain K until it is negatively judged at the above-described step ST9, thereby gradually decreasing the gain K. Therefore, when it is judged that the drive system resonates with the execution of the vehicle body vibration-damping control, the suppression effect of the sprung vibration can be gradually made small, so that it is possible to prevent the deterioration of the driving quality by the occurrence of the feeling of roughness due to the excessive suppression of the pitching motion of the vehicle body and the occurrence of the vibration back and forth of the vehicle.

On the other hand, when it is judged that the actual output shaft rotational number change amount ΔNpa is not larger than the predicted output shaft rotational number change amount ΔNp (negative judgment) at the above-described step ST9, that is to say, when it is judged that the drive system does not resonate, the vehicle body vibration-damping control amount adjusting means judges whether the currently set gain K of the FB secondary regulator unit 3h is as large as the initial set value K0 (step ST22).

Herein, when it is judged that the gain K is as large as the initial set value K0, the vehicle body vibration-damping control amount adjusting means terminates the calculation processing operation once and the procedure returns to the step ST2. Therefore, in this case, the normal vehicle body vibration-damping control (that when the vehicle body vibration-damping control amount is not decreased by the vehicle body vibration-damping control amount adjusting means) is executed.

On the other hand, when it is judged that the gain K is not as large as the initial set value K0 (strictly, when it is judged that K<K0), the vehicle body vibration-damping control amount adjusting means performs a correction to increase the gain K (step ST23). Herein, the gain K(n) of this time is calculated by adding the correction value B2 (0<B2<1.0) to the previous gain K(n−1) by using a following equation 10 (n=1, 2, 3 ... ).

$$K(n)=K(n-1)+B2 \quad \ldots (10)$$

Then, the vehicle body vibration-damping control amount adjusting means judges whether the gain K{=K(n)}, which becomes larger by the correction, becomes larger than the initial set value K0 (step ST24).

When it is judged that the gain K after the correction is not larger than the initial set value K0 at the step ST24, the vehicle body vibration-damping control amount adjusting means terminates the calculation processing operation once and the procedure returns to the step ST2, and increasing correction of the gain K is repeated at the above-describe step ST23 until the gain K is judged to be as large as the initial set value K0 at the above-described step ST22.

Also, when it is judged that the gain K after the correction becomes larger than the initial set value K0 at the step ST24, the vehicle body vibration-damping control amount adjusting means sets the gain K to the initial set value K0 (step ST25).

According to this, the vehicle body vibration-damping control amount adjusting means can return the gain K to which the decreasing correction is performed to the initial set value K0 when the resonance of the drive system disappears. Therefore, the vehicle body vibration-damping control amount adjusting means can execute the normal appropriate vehicle body vibration-damping control.

Also, the FB system vibration-damping torque compensation amount U·FB is calculated based on the gain K{=(Kn)}, which becomes larger by the correction, by the FB secondary regulator unit $3h$ until the gain K is returned to the initial set value K0. That is to say, the FB system vibration-damping torque compensation amount U·FB becomes larger than that obtained by calculating based on the gain K{K(n−1)} before the correction. Therefore, the decreased vehicle body vibration-damping control amount becomes large at the time of the correction and the suppression effect of the sprung vibration in the vehicle body vibration-damping control at that time becomes larger than previous one even though this is smaller than that when executing the normal vehicle body vibration-damping control.

In this manner, the vehicle controlling apparatus of the second embodiment can decrease the vehicle body vibration-damping control amount by the decreasing correction of the gain when the drive system resonates, thereby making the suppression effect of the sprung vibration by the execution of the vehicle body vibration-damping control small, so that it is possible to prevent the deterioration of the driving quality by the occurrence of the feeling of roughness due to the excessive suppression of the pitching motion of the vehicle body and the occurrence of the vibration back and forth of the vehicle.

In the vehicle controlling apparatus of the second embodiment, another gain (the above-described FF control gain K·FF set by the FF control gain setting unit $3j$ according to the state of the vehicle 10 and the FB control gain K·FB set by the FB control gain setting unit 31 according to the state of the vehicle 10) is also used when determining the vehicle body vibration-damping control amount. Therefore, in the vehicle controlling apparatus, the FF control gain setting unit $3j$ and the FB control gain setting unit 31 may be provided with a decreasing correction function and an increasing correction function of the gain of the second embodiment. That is to say, the vehicle controlling apparatus may be configured such that the vehicle body vibration-damping control amount is corrected along intention of the second embodiment by correcting the FF control gain K·FF and the FB control gain K·FB.

Herein, the vehicle body vibration-damping control amount adjusting means of the second embodiment may be configured to directly decrease the set vehicle body vibration-damping control amount. Also, when the vehicle body vibration-damping control amount adjusting means at that time decreases the vehicle body vibration-damping control amount once, this may gradually directly return the vehicle body vibration-damping control amount to the set value at that time when the resonance of the drive system disappears thereafter, thereby returning such that the normal vehicle body vibration-damping control may be executed. That is to say, the vehicle body vibration-damping control amount adjusting means is configured to also have the function as the vehicle body vibration-damping control returning means for gradually returning the vehicle body vibration-damping control to the normal vehicle body vibration-damping control.

For example, the vehicle body vibration-damping control amount adjusting means is allowed to correct the correction coefficient with the initial set value "1.0", for example, the gain G with the initial set value G0(=1.0) within a range of "0<G<1.0" and to correct the vehicle body vibration-damping control amount based on a following equation 11 by using the gain G after the correction. Herein, this is referred to as a vehicle body vibration-damping control amount Cb(n) (n=1, 2, 3 . . . ).

$$Cb(n)=Cb(n-1)*G \qquad \ldots (11)$$

Also, for example, when the drive system is judged to resonate with the execution of the vehicle body vibration-damping control with the set value, the vehicle body vibration-damping control amount adjusting means may multiply a predetermined correction coefficient A3 (0<A3<1.0) by the currently set gain G to decrease the gain G, thereby decreasing the vehicle body vibration-damping control amount Cb(n), and may subtract a predetermined correction value B3 (B3>0) smaller than the gain G from the currently set gain G to decrease the gain, thereby decreasing the vehicle body vibration-damping control amount Cb(n). The correction coefficient A3 and the correction value B3 may be set in advance or may be changed according to the difference between the change predicted value of the vehicle body vibration-damping control amount Cb(n) (predicted output torque change amount ΔTp of power source and predicted wheel torque change amount ΔTd of driving wheels $W_{RL}$ and $W_{RR}$) and the actual output value change amount (actual output torque of power source and actual wheel torque of driving wheels $W_{RL}$, $W_{RR}$) within the vehicle body vibration-damping control amount change period t0, for example, the difference between the predicted output shaft rotational number change amount ΔNp and the actual output shaft rotational number change amount ΔNpa in the power source. In the latter case, the correction coefficient A3 and the correction value B3 are made smaller such that a decrease amount of the vehicle body vibration-damping control amount Cb(n) becomes larger as the difference is larger.

Also, the vehicle body vibration-damping control amount adjusting means may multiply a predetermined correction coefficient A4 (A4>1.0) by the current gain G to increase the gain G when returning the vehicle body vibration-damping control to the normal vehicle body vibration-damping control, thereby increasing the vehicle body vibration-damping control amount Cb(n), and may add a predetermined correction value B4 (0<B4<1.0) to the current gain G to increase the gain G, thereby increasing the vehicle body vibration-damping control amount Cb(n). The correction coefficient A4 and the correction value B4 are set in advance. An upper limit of the increase in the vehicle body vibration-damping control amount Cb(n) is the currently set vehicle body vibration-damping control amount.

An example of the adjusting operation of the vehicle body vibration-damping adjusting control amount in the vehicle controlling apparatus in this case is described with reference to a flowchart in FIG. 10. Meanwhile, this is the same as the example in FIG. 9 described above until the comparison judgment at the step ST9, so that the description is herein omitted.

The vehicle body vibration-damping control amount adjusting means herein performs the correction to decrease the currently set gain G when it is judged that the actual output shaft rotational number change amount ΔNpa is larger than the predicted output shaft rotational number change amount ΔNp (positive judgment), that is to say, when it is judged that the drive system resonates at the step ST9 (step ST31). Herein, a gain G(n) of this time is calculated by multiplying the correction coefficient A3 (0<A3<1.0) by a previous gain G(n−1) by using a following equation 12 (n=1, 2, 3 ...). Since the initial set value G0 of the gain G is "1.0", the gain G(n) is calculated within a range from 0 to 1.0 at the step ST31 {0<G(n)<1.0}.

$$G(n)=G(n-1)*A3 \quad \ldots (12)$$

In this case, the vehicle body vibration-damping control amount adjusting means performs the decreasing correction of the vehicle body vibration-damping control amount Cb(n) by substituting the decreased gain G{=G(n)} after the correction into the above-described equation 11. According to this, the vehicle body vibration-damping control Cb(n) becomes smaller than that when executing the normal vehicle body vibration-damping control (that when the vehicle body vibration-damping control amount is not decreased by the vehicle body vibration-damping control amount adjusting means). Therefore, in the vehicle body vibration-damping control at that time, the suppression effect of the sprung vibration becomes smaller than that when executing the normal vehicle body vibration-damping control.

The vehicle body vibration-damping control amount adjusting means repeats the decreasing correction of the gain G until it is positively judged at the above-described step ST9 to gradually decreases the gain G. Therefore, when it is judged that the drive system resonates with the execution of the vehicle body vibration-damping control, the suppression effect of the sprung vibration can be gradually made small, so that it is possible to prevent the deterioration of the driving quality by the occurrence of the feeling of roughness due to the excessive suppression of the pitching motion of the vehicle body and the occurrence of the vibration back and forth of the vehicle.

On the other hand, when it is judged that the actual output shaft rotational number change amount ΔNpa is not larger than the predicted output shaft rotational number change amount ΔNp (negative judgment), that is to say, when it is judged that the drive system does not resonate at the above-described step ST9, the vehicle body vibration-damping control amount adjusting means judges whether the currently set gain G is as large as the initial set value G0(=1.0) (step ST32).

Herein, when it is judged that the gain G is as large as the initial set value G0, the vehicle body vibration-damping control amount adjusting means terminates the calculation processing operation once and the procedure returns to the step ST2. Therefore, the normal vehicle body vibration-damping control is executed in this case.

On the other hand, when it is judged that the gain G is not as large as the initial set value G0 (strictly, when it is judged that G<1.0), the vehicle body vibration-damping control amount adjusting means performs the correction to increase the gain G (step ST33). Herein, the gain G(n) of this time is calculated by adding the correction value B4 (0<B4<1.0) to the previous gain G(n−1) by using a following equation 13 (n=1, 2, 3 ...).

$$G(n)=G(n-1)+B4 \quad \ldots (13)$$

Then, the vehicle body vibration-damping control amount adjusting means judges whether the gain G{=G(n)}, which becomes larger by the correction, becomes larger than the initial set value G0(=1.0) (step ST34).

When it is judged that the gain G after the correction is not larger than the initial set value G0 at the step ST34, the vehicle body vibration-damping control amount adjusting means terminates the calculation processing operation once and the procedure returns to the step ST2, and the increasing correction of the gain G is repeated at the above-described step ST33 until the gain G is judged to be as large as the initial set value G0 at the above-described step ST32.

Also, when it is judged that the gain G after the correction becomes larger than the initial set value G0 at the step ST34, the vehicle body vibration-damping control amount adjusting means sets the gain G to the initial set value G0(=1.0) (step ST35).

According to this, the vehicle body vibration-damping control amount adjusting means can return the gain G to which the decreasing correction is performed to the initial set value G0(=1.0) when the resonance of the drive system disappears. Therefore, the vehicle body vibration-damping control amount adjusting means can execute the normal appropriate vehicle body vibration-damping control. Meanwhile, when the gain G is the initial set value G0(=1.0), the vehicle body vibration-damping control amount adjusting means is not necessarily required to perform the calculation to substitute the gain G into the above-described equation 11.

Also, until the gain G returns to the initial set value G0, the increasing correction is performed to the vehicle body vibration-damping control amount by the gain G={G(n)}, which becomes large by the correction. Therefore, the decreased vehicle body vibration-damping control amount becomes large at the time of the correction and the suppression effect of the sprung vibration in the vehicle body vibration-damping control at that time becomes larger than previous one even though this is smaller than that when executing the normal vehicle body vibration-damping control.

In this manner, in the vehicle controlling apparatus in this case also, when the drive system resonates, the vehicle body vibration-damping control amount can be decreased by the decreasing correction of the gain G, thereby making the suppression effect of the sprung vibration by the execution of the vehicle body vibration-damping control smaller, so that it is possible to prevent the deterioration of the driving quality by the occurrence of the feeling of roughness due to the excessive suppression of the pitching motion of the vehicle body and the occurrence of the vibration back and forth of the vehicle.

Further, the vehicle body vibration-damping control amount adjusting means may decrease the vehicle body vibration-damping control amount by subtracting a predetermined correction value Y(>0) from the set vehicle body vibration-damping control amount, and can obtain the effect similar to that in the above-described example. The correction value Y1 may be set in advance or may be changed according to the difference between the change predicted value of the vehicle body vibration-damping control amount (predicted output torque change amount ΔTp of power source and predicted wheel torque change amount ΔTd of driving wheels $W_{RL}$ and $W_{RR}$) and the actual output value change amount (actual output torque of power source, actual wheel torque of driving wheels $W_{RL}$ and $W_{RR}$) within the vehicle body vibration-damping control amount change period t0, for example, the difference between the predicted output shaft rotational number change amount ΔNp and the actual output shaft rotational number change amount ΔNpa in the power source. In the latter case, the correction value Y1 is adjusted such that the decrease amount of the vehicle body vibration-damping control amount becomes larger as the difference is larger.

Also, the vehicle body vibration-damping control amount adjusting means may add a predetermined correction value Y2 (Y2>0) to the current vehicle body vibration-damping control amount when returning the vehicle body vibration-damping control to the normal vehicle body vibration-damping control to increase the vehicle body vibration-damping control amount, and can obtain the effect similar to that in the above-described example. The upper limit of the increase in the vehicle body vibration-damping control amount is the currently set vehicle body vibration-damping control amount. The correction value Y2 is set in advance.

Herein, although not illustrated in FIG. 2, the vehicle body vibration-damping control returning means similar to that in the first embodiment may be separately provided in the vehicle controlling apparatus in the second embodiment. That is to say, in the second embodiment, the vehicle body vibration-damping control returning means for returning the vehicle body vibration-damping control to the normal vehicle body vibration-damping control when the control condition of the drive system (that is to say, gear position (or gear ratio) of transmission 30) is changed, and when the average value ΔNpave of the output shaft rotational number change amount of the power source within the predetermined period t1 is smaller than the predetermined value ΔNp0 may be provided. The vehicle body vibration-damping control returning means in the second embodiment rapidly returns the vehicle body vibration-damping control to the normal vehicle body vibration-damping control by immediately returning the above-described gain and correction value to the initial set value in the case of such condition.

INDUSTRIAL APPLICABILITY

As described above, the vehicle controlling apparatus according to the present invention is useful in the technology to prevent the deterioration of the driving quality associated with the execution of the vehicle body vibration-damping control when the drive system vibration occurs.

The invention claimed is:

1. A vehicle controlling apparatus that performs vehicle body vibration-damping control to suppress vibration occurring in a vehicle body by changing wheel torque of a driving wheel by controlling output torque of a power source, wherein
the vehicle controlling apparatus inhibits the vehicle body vibration-damping control such that a drive system of a vehicle, which transmits power of the power source, does not resonate with execution of the vehicle body vibration-damping control, or adjusts a control amount of the vehicle body vibration-damping control in a direction to suppress a vibration suppression effect of the vehicle body vibration-damping control, and
the vehicle controlling apparatus compares a change amount of predicted output shaft rotational number of the power source according to a change amount of a predicted output torque of the power source when executing the vehicle body vibration-damping control with a change amount of an actual output shaft rotational number of the power source within a change period of the predicted output torque to judge that the drive system resonates when the change amount of the actual output shaft rotational number is larger than the change amount of the predicted output shaft rotational number, and performs inhibiting operation of the vehicle body vibration-damping control or adjusting operation of the control amount of the vehicle body vibration-damping control when it is judged that the drive system resonates.

2. The vehicle controlling apparatus according to claim 1, wherein the vehicle controlling apparatus releases inhibiting operation of the vehicle body vibration-damping control or adjusting operation of the control amount of the vehicle body vibration-damping control when a control condition of the drive system is changed.

3. The vehicle controlling apparatus according to claim 1, wherein the vehicle controlling apparatus releases inhibiting operation of the vehicle body vibration-damping control or adjusting operation of the control amount of the vehicle body vibration-damping control when a gear position of a transmission is changed.

4. The vehicle controlling apparatus according to claim 1, wherein the vehicle controlling apparatus releases inhibiting operation of the vehicle body vibration-damping control or adjusting operation of the control amount of the vehicle body vibration-damping control when actual output torque of the power source changes by a predetermined amount or larger.

5. The vehicle controlling apparatus according to claim 1, wherein the control amount of the vehicle body vibration-damping control is adjusted by correction of a gain used when setting the control amount.

6. A vehicle controlling apparatus that performs vehicle body vibration-damping control to suppress vibration occurring in a vehicle body by changing wheel torque of a driving wheel by controlling output torque of a power source, wherein
the vehicle controlling apparatus compares a change amount of predicted output torque of the power source when executing the vehicle body vibration-damping control with a change amount of actual output torque of the power source within a change period of the predicted output torque, and inhibits the vehicle body vibration-damping control or adjusts a control amount of the vehicle body vibration-damping control in a direction to suppress a vibration suppression effect of the vehicle body vibration-damping control when the change amount of the actual output torque is larger than the change amount of the predicted output torque, and
the vehicle controlling apparatus compares a change amount of predicted output shaft rotational number of the power source according to a change amount of a predicted output torque of the power source when executing the vehicle body vibration-damping control with a change amount of an actual output shaft rotational number of the power source within a change period of the predicted output torque to judge that the drive system resonates when the change amount of the actual output shaft rotational number is larger than the change amount of the predicted output shaft rotational number, and performs inhibiting operation of the vehicle body vibration-damping control or adjusting operation of the control amount of the vehicle body vibration-damping control when it is judged that the drive system resonates.

7. A vehicle controlling apparatus that performs vehicle body vibration-damping control to suppress vibration occurring in a vehicle body by changing wheel torque of a driving wheel by controlling output torque of a power source, the vehicle controlling apparatus comprising:
a vehicle body vibration-damping control inhibiting unit that inhibits the vehicle body vibration-damping control such that a drive system of a vehicle, which transmits power of the power source, does not resonate with execution of the vehicle body vibration-damping control; or/and
a vehicle body vibration-damping control amount adjusting unit that adjusts a control amount of the vehicle body vibration-damping control in a direction to suppress a vibration suppression effect of the vehicle body vibration-damping control, and
a drive system resonance judging unit that compares a change amount of predicted output toque of the power source when executing the vehicle body vibration-damping control with a change amount of actual output torque of the power source within a change period of the predicted output torque to judge that the drive system resonates with the execution of the vehicle body vibration-damping control when the change amount of the actual output torque is larger than the change amount of the predicted output torque, wherein the vehicle controlling apparatus is configured to perform inhibiting operation of the vehicle body vibration-damping control by the vehicle body vibration-damping control inhibiting unit or/and adjusting operation of the control amount of the vehicle body vibration-damping control by the vehicle body vibration-damping control amount adjusting unit when the drive system resonance judging unit judges that the drive system resonates.

8. The vehicle controlling apparatus according to claim 7, further comprising:

a drive system resonance judging unit that compares a change amount of a predicted output shaft rotational number of the power source according to a change amount of predicted output torque of the power source when executing the vehicle body vibration-damping control with a change amount of an actual output shaft rotational number of the power source within a change period of the predicted output torque to judge that the drive system resonates with the execution of the vehicle body vibration-damping control when the change amount of the actual output shaft rotational number is larger than the change amount of the predicted output shaft rotational number, wherein the vehicle controlling apparatus is configured to perform inhibiting operation of the vehicle body vibration-damping control by the vehicle body vibration-damping control inhibiting unit or/and adjusting operation of the control amount of the vehicle body vibration-damping control by the vehicle body vibration-damping control amount adjusting unit when the drive system resonance judging unit judges that the drive system resonates.

9. The vehicle controlling apparatus according to claim 7, further comprising:

a vehicle body vibration-damping control returning unit that releases inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when a control condition of the drive system is changed.

10. The vehicle controlling apparatus according to claim 7, further comprising:

a vehicle body vibration-damping control returning unit that releases inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when a gear position of a transmission is changed.

11. The vehicle controlling apparatus according to claim 7, further comprising:

a vehicle body vibration-damping control returning unit that releases inhibiting operation of the vehicle body vibration-damping control by the vehicle body vibration-damping control inhibiting unit or adjusting operation of the control amount of the vehicle body vibration-damping control by the vehicle body vibration-damping control amount adjusting unit when actual output torque of the power source changes by a predetermined amount or larger.

12. The vehicle controlling apparatus according to claim 7, wherein the vehicle body vibration-damping control amount adjusting unit is configured to adjust the control amount by correction of a gain used when setting the control amount of the vehicle body vibration-damping control.

* * * * *